(12) United States Patent
Itagaki

(10) Patent No.: US 9,355,775 B2
(45) Date of Patent: May 31, 2016

(54) CERAMIC ELECTRONIC COMPONENT

(71) Applicant: Murata Manufacturing Co., Ltd., Nagaokakyo-shi, Kyoto-fu (JP)

(72) Inventor: Yoji Itagaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 63 days.

(21) Appl. No.: 14/283,380

(22) Filed: May 21, 2014

(65) Prior Publication Data
US 2014/0345927 A1 Nov. 27, 2014

(30) Foreign Application Priority Data

May 27, 2013 (JP) .................. 2013-111002
Mar. 11, 2014 (JP) .................. 2014-047965

(51) Int. Cl.
*H01G 4/30* (2006.01)
*H01G 2/06* (2006.01)
*H01G 4/232* (2006.01)
*H01G 4/228* (2006.01)

(52) U.S. Cl.
CPC ............ *H01G 2/065* (2013.01); *H01G 4/232* (2013.01); *H01G 4/30* (2013.01); *H01G 4/2325* (2013.01)

(58) Field of Classification Search
CPC .......... H01G 4/232; H01G 4/228; H05K 3/32
USPC ................................................ 361/321.1
See application file for complete search history.

(56) References Cited

U.S. PATENT DOCUMENTS

| 6,181,544 B1 * | 1/2001 | Nakagawa | H01G 4/228 361/306.1 |
| 6,191,933 B1 * | 2/2001 | Ishigaki | H01G 4/232 361/309 |
| 6,288,887 B1 * | 9/2001 | Yoshida | H05K 3/3426 361/306.1 |
| 6,400,551 B1 * | 6/2002 | Lin | H01G 2/06 361/301.3 |

(Continued)

FOREIGN PATENT DOCUMENTS

| GB | EP213174 A * | 3/2009 | ............. H05K 3/32 |
| JP | 2000-235932 A | 8/2000 | |

(Continued)

*Primary Examiner* — Timothy Thompson
*Assistant Examiner* — Michael F McAllister
(74) *Attorney, Agent, or Firm* — Keating & Bennett, LLP

(57) ABSTRACT

A ceramic electronic component includes an electronic component body and a pair of metal terminals. The electronic component body includes a ceramic element assembly and outer electrodes. The pair of metal terminals are connected to the outer electrodes by a bonding member. Each of the pair of metal terminals includes a terminal body and a plated film that is located on a surface of the terminal body. In addition, each of the pair of metal terminals includes a terminal bonding portion, a mounting portion, and an extension portion that is provided between the terminal bonding portions and the mounting portion. A plating-removal portion from which the plated film is removed is provided at least at a peripheral surface of the mounting portion, and thus a surface of the terminal body is exposed.

19 Claims, 31 Drawing Sheets

CROSS-SECTIONAL VIEW TAKEN ALONG LINE A-A

CROSS-SECTIONAL VIEW TAKEN ALONG LINE B-B

(56) References Cited

U.S. PATENT DOCUMENTS

| | | | | |
|---|---|---|---|---|
| 7,365,957 B2 * | 4/2008 | Togashi | .................. | H01G 2/065 361/306.3 |
| 7,909,480 B2 * | 3/2011 | Kang | .................... | G02B 6/0073 362/249.02 |
| 8,134,825 B2 * | 3/2012 | Otsuka | .................. | H01G 2/065 361/306.1 |
| 8,310,808 B2 * | 11/2012 | Togashi | .................. | H01G 4/30 361/303 |
| 2004/0183147 A1 * | 9/2004 | Togashi | .................. | H01G 2/065 257/414 |
| 2009/0296311 A1 * | 12/2009 | Otsuka | .................. | H01G 2/065 361/306.3 |
| 2010/0123995 A1 * | 5/2010 | Otsuka | ..................... | H01G 2/06 361/308.1 |

FOREIGN PATENT DOCUMENTS

| | | | | |
|---|---|---|---|---|
| JP | 2010-016326 A | | 1/2010 | |
| JP | 2012-023322 | * | 2/2012 | ............... H01G 4/12 |
| JP | 2012-033650 | * | 2/2012 | ............. H01G 4/228 |

* cited by examiner

CROSS-SECTIONAL
VIEW TAKEN ALONG
LINE D-D

CROSS-SECTIONAL VIEW TAKEN ALONG LINE E-E

CROSS-SECTIONAL
VIEW TAKEN ALONG
LINE F-F

CERAMIC ELECTRONIC COMPONENT

BACKGROUND OF THE PRESENT INVENTION

1. Field of the present invention

The present invention relates to a ceramic electronic component which includes a stacked ceramic capacitor.

2. Description of the Related Art

In recent years, reduction in size and increase in functionality of electronic apparatuses have rapidly progressed. Reduction in size of a stacked ceramic capacitor that is mounted on an electronic apparatus has also been desired. For example, a stacked ceramic capacitor having a large electrostatic capacity is commercially produced as an alternative to an aluminum electrolytic capacitor due to the progress of a thin-layer technique and a multi-layer technique.

As illustrated in FIG. 26, a stacked ceramic capacitor 2 that is an electronic component body includes a ceramic element assembly 5 in which a plurality of ceramic layers 3 and a plurality of inner electrodes 4 are alternately stacked. Adjacent inner electrodes of the plurality of inner electrodes 4 are alternately led to opposite end surfaces of the ceramic element assembly 5. An outer electrode 6, which is electrically connected to the inner electrode 4, is formed on the end surfaces of the ceramic element assembly 5 to which the inner electrodes 4 are led. According to this configuration, an electrostatic capacitance is formed between the outer electrodes 6 provided at opposite end portions of the ceramic element assembly 5. The stacked ceramic capacitor 2 is mounted on a mounting substrate 7 with mounting solder 6a. At this time, the outer electrodes 6 of the stacked ceramic capacitor 2 are mounted on the mounting substrate 7 with the mounting solder 6a.

In the stacked ceramic capacitor 2, as a material of the ceramic layers 3, a ferroelectric material such as barium titanate having a relatively high dielectric constant is typically used, but the ferroelectric material has piezoelectricity and electrostriction. When an AC voltage is applied to the stacked ceramic capacitor 2, a mechanical strain is generated at the ceramic layers 3. When vibration due to the strain is transmitted to the mounting substrate 7 through the outer electrodes 6, the entirety of the mounting substrate 7 serves as an acoustic radiation surface, and thus there is a concern that acoustic noise may be generated.

As a countermeasure to the above problems, a configuration disclosed in Japanese Unexamined Patent Application Publication Nos. 2000-235932 and 2010-016326 has been suggested. For example, as illustrated in FIG. 27, a pair of metal terminals are connected to outer electrodes 6 of a stacked ceramic capacitor 2 with solder for terminal bonding to prepare a ceramic electronic component 9, and the pair of metal terminals 8 are soldered to a mounting substrate 7 in such a manner that a gap is provided between the mounting substrate 7 and the stacked ceramic capacitor 2. With this configuration, a stress, which is generated in synchronization with a frequency of the AC voltage, is mitigated with elastic deformation of the pair of metal terminals 8. According to description of Japanese Unexamined Patent Application Publication Nos. 2000-235932 and 2010-016326, a plated film such as an Sn film is formed on the surface of the pair of metal terminals 8.

However, as is the case with the ceramic electronic component 9 described in Japanese Unexamined Patent Application Publication Nos. 2000-235932 and 2010-016326, in a case where a plated film is formed on the surface of the metal terminals 8, when mounting the ceramic electronic component 9 on the mounting substrate 7 with mounting solder, solder wettability of the mounting solder with respect to the metal terminal 8 is improved. Accordingly, when mounting the ceramic electronic component 9 on the mounting substrate 7 with the mounting solder, the mounting solder tends to wet a portion between the stacked ceramic capacitor 2 and the metal terminals 8 along the plated film on the surface of the metal terminals 8. Specifically, the mounting solder tends to wet a surface of a mounting portion of each of the metal terminals 8, which extends in parallel with the mounting substrate 7 and is mounted on the mounting substrate 7, on a side facing the ceramic electronic component 9, and a surface of an extension portion of each of the metal terminals 8, which extends vertically with respect to the mounting substrate 7, on a side facing an end surface of the ceramic electronic component 9. Therefore, a space at the portion between the stacked ceramic capacitor 2 and the metal terminal 8 (space from a lower surface of the stacked ceramic capacitor 2 to the mounting portion of the metal terminal 8) may be filled with the mounting solder in some cases. Specifically, over the surface of the mounting portion of the metal terminal 8 on a side facing the ceramic electronic component 9 to the surface of the extension portion of the metal terminal 8, which extends vertically to the mounting substrate 7, on a side facing the end surface of the ceramic electronic component 9, the mounting solder tends to stay at a corner portion at which the surface of the mounting portion of the metal terminal 8 on a side facing the ceramic electronic component 9, and the surface of the extension portion of the metal terminal 8, which extends vertically to the mounting substrate 7, on a side facing the end surface of the ceramic electronic component 9 intersect each other. Therefore, the gap between the mounting substrate 7 and the stacked ceramic capacitor 2 may not be sufficiently secured, or the elastic deformation of the metal terminal 8 may be hindered. As a result, the intrinsic function of the metal terminal 8, which suppresses transmission of vibration of the stacked ceramic capacitor 2, may be insufficient in some cases.

In addition, for example, in a case where a stacking direction of the inner electrodes 4 of the stacked ceramic capacitor 2 is a direction of connecting a mounting surface and a main surface thereof, a direction of an electric field becomes a vertical direction. At this time, as illustrated in FIGS. 28 and 29, when the stacked ceramic capacitor 2 contracts, the central portion of the stacked ceramic capacitor 2 in a second direction y greatly expands in the vertical direction z and greatly contracts in a first direction x in comparison to both end portions in the second direction y. The central portion of the stacked ceramic capacitor 2 in the vertical direction z largely contracts in both of the first direction x and the second direction y in comparison to both end portions in the vertical direction z.

Therefore, as illustrated in FIG. 30, for example, in a case of the ceramic electronic component 9 in which the pair of metal terminals 8 are bonded to the entire surface of the outer electrodes 6, the pair of metal terminal 8 are greatly deformed along with the deformation of the stacked ceramic capacitor 2, as illustrated in FIG. 31. As a result, vibration of the stacked ceramic capacitor 2 tends to propagate to the mounting substrate 7 through the pair of metal terminals 8, and thus acoustic noise due to substrate vibration tends to occur. In addition, with regard to an end surface and a side surface of the stacked ceramic capacitor 2, the length of the side surface is longer than the length of the end surface. Therefore, in a case where deformation of the same magnitude occurs at the central portion of the end surface and the central portion of the side surface of the stacked ceramic capacitor 2, since the length of the side surface is longer than the length of the end surface, an amount of deformation of corner portions, at which the outer electrodes 6 of the stacked ceramic capacitor 2 are located, tends to be small on a side surface side of the stacked ceramic capacitor 2 in comparison to an end surface side of the stacked ceramic capacitor 2.

SUMMARY OF THE PRESENT INVENTION

Accordingly, preferred embodiments of the present invention provide a ceramic electronic component that significantly reduces or prevents generation of vibration sound due to vibration of a mounting substrate caused by a mechanical strain in an electronic component body of a ceramic electronic component.

According to a preferred embodiment of the present invention, a ceramic electronic component includes an electronic component body including a ceramic element assembly that includes two opposite main surfaces, two opposite end surfaces, and two opposite side surfaces, and outer electrodes, each being arranged to cover each of the end surfaces and a portion of the side surfaces of the ceramic element assembly; and metal terminals, each being connected to each of the outer electrodes at positions of both of the side surfaces of the ceramic element assembly. Each of the metal terminal includes a terminal body, a plated film that is located on a surface of the terminal body, terminal bonding portions that are connected to the outer electrode at positions of the side surfaces of the ceramic element assembly, a mounting portion which is connected to an electrode of a mounting substrate on which the ceramic electronic component is mounted, and which faces a lower surface of the ceramic element assembly, and extension portions, each being provided between each of the terminal bonding portions and the mounting portion to have a gap between a surface of the ceramic element assembly which faces the mounting substrate and the mounting portion. The surface of the terminal body is exposed at a peripheral surface of the mounting portion.

In a ceramic electronic component according to a preferred embodiment of the present invention, it is preferable that the surface of the terminal body be exposed at a peripheral surface of the extension portion.

In addition, in a ceramic electronic component according to a preferred embodiment of the present invention, it is preferable that the surface of the terminal body be exposed at a peripheral surface of the terminal bonding portion.

In addition, a ceramic electronic component according to a preferred embodiment of the present invention, it is preferable that the terminal bonding portion, the mounting portion, and the extension portion be integrally formed so as to be defined by a single monolithic member.

According to a ceramic electronic component according to a preferred embodiment of the present invention, a plating-removal portion from which the plated film is removed is located on a peripheral surface of the mounting portion of the metal terminal, and thus a base material of the metal terminal is exposed. Accordingly, when mounting the ceramic electronic component to the mounting substrate with mounting solder, since wetting of the mounting solder to the metal terminal is significantly reduced or prevented, wetting of the mounting solder to a gap portion between the electronic component body and the metal terminal is significantly reduced or prevented, and thus it is possible to prevent the gap portion from being filled with the mounting solder. Accordingly, it is possible to sufficiently secure a space of the gap portion, and thus it is possible to significantly reduce or prevent transmission of vibration to the mounting substrate without hindering elastic deformation of the metal terminal. As a result, it is possible to significantly reduce or prevent generation of a vibration sound based on vibration of the mounting substrate due to a mechanical strain in the electronic component body of the ceramic electronic component.

In addition, in a case where the plating-removal portion is formed on a peripheral surface of the extension portion, it is possible to further suppress wetting of the mounting solder to the metal terminal, and thus it is possible to further suppress wetting of the mounting solder to the gap portion between the electronic component body and the metal terminal.

In addition, in a case where the plating-removal portion is provided on a peripheral surface of the terminal bonding portion, it is also possible to significantly reduce or prevent wetting of the mounting solder to the metal terminal, and thus it is possible to further reduce or prevent wetting of the mounting solder to the gap portion between the electronic component body and the metal terminal.

According to various preferred embodiments of the present invention, a ceramic electronic component, which contributes to significantly reducing or preventing generation of a vibration sound caused by vibration of a mounting substrate due to a mechanical strain in an electronic component body of a ceramic electronic component, is obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A and 7B illustrate another example of the ceramic electronic component according to a preferred embodiment of the present invention, in which FIG. 7A is an external perspective view of the ceramic electronic component and FIG. 7B is a front view of the ceramic electronic component.

FIGS. 9A and 9B illustrate still another example of the ceramic electronic component according to a preferred embodiment of the present invention, in which FIG. 9A is a front view of the ceramic electronic component, and FIG. 9B is an external perspective view illustrating a second modification of the metal terminal that is used in the ceramic electronic component illustrated in FIG. 9A.

FIGS. 10A and 10B illustrate still another example of the ceramic electronic component according to a preferred embodiment of the present invention, in which FIG. 10A is a front view of the ceramic electronic component, and FIG. 10B is an external perspective view illustrating a third modification of the metal terminal that is used in the ceramic electronic component illustrated in FIG. 10A.

FIGS. 11A to 11C are external perspective views illustrating the metal terminal, in which FIG. 11A illustrates a fourth modification of the metal terminal, FIG. 11B illustrates a fifth modification of the metal terminal, and FIG. 11C illustrates a sixth modification of the metal terminal.

FIGS. 12A and 12B are external perspective views illustrating the metal terminal, in which FIG. 12A illustrates a seventh modification of the metal terminal, and FIG. 12B illustrates an eighth modification of the metal terminal.

FIGS. 13A to 13C are external perspective views illustrating the metal terminal, in which FIG. 13A illustrates a ninth modification of the metal terminal, FIG. 13B illustrates a tenth modification of the metal terminal, and FIG. 13C illustrates an eleventh modification of the metal terminal.

FIGS. 16A and 16B are external perspective views illustrating the metal terminal, in which FIG. 16A illustrates a fourteenth modification of the metal terminal, and FIG. 16B illustrates a fifteenth modification of the metal terminal.

FIGS. 17A and 17B are external perspective views illustrating the metal terminal, in which FIG. 17A illustrates a sixteenth modification of the metal terminal, and FIG. 17B illustrates a seventeenth modification of the metal terminal.

DETAILED DESCRIPTION OF THE PREFERRED EMBODIMENTS

Figure 1:
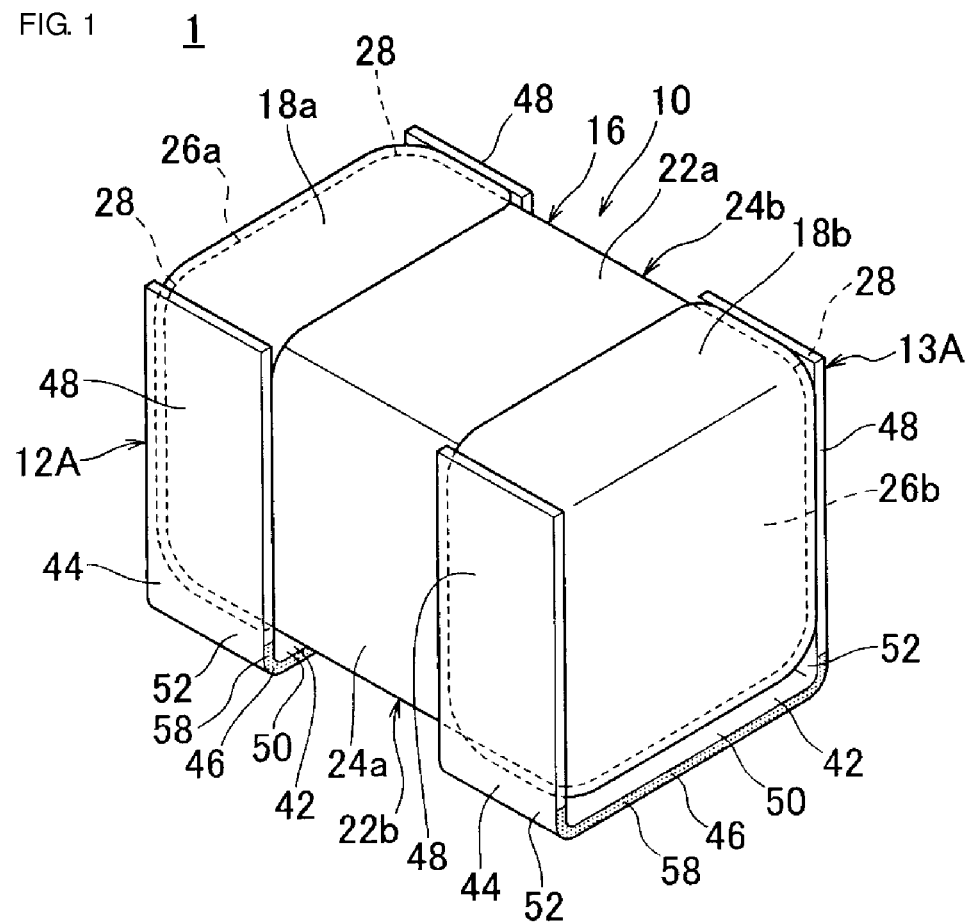
FIG. 1 is an external perspective view illustrating an example of a ceramic electronic component according to a preferred embodiment of the present invention.
Figure 2:
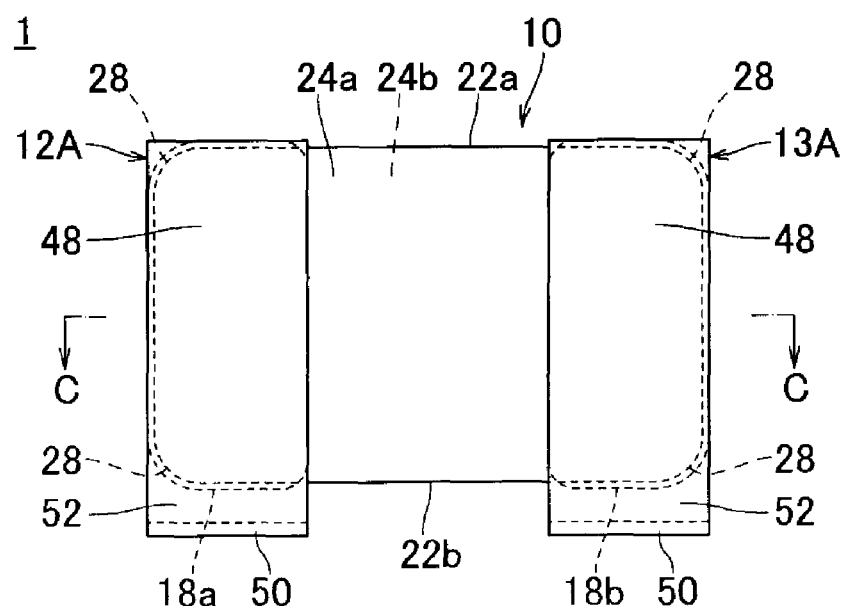
FIG. 2 is a side view illustrating an example of the ceramic electronic component according to a preferred embodiment of the present invention.
Figure 3:
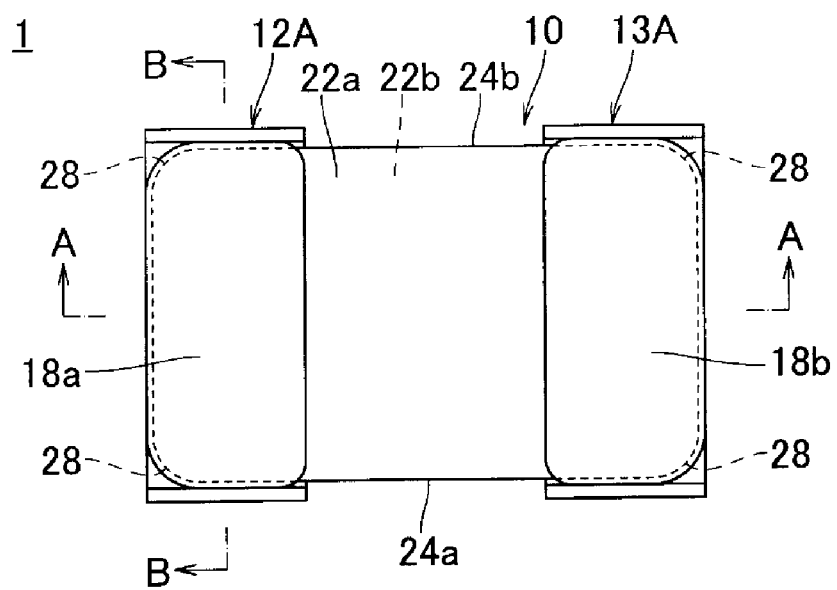
FIG. 3 is a top view illustrating an example of the ceramic electronic component according to a preferred embodiment of the present invention.
Figure 4:
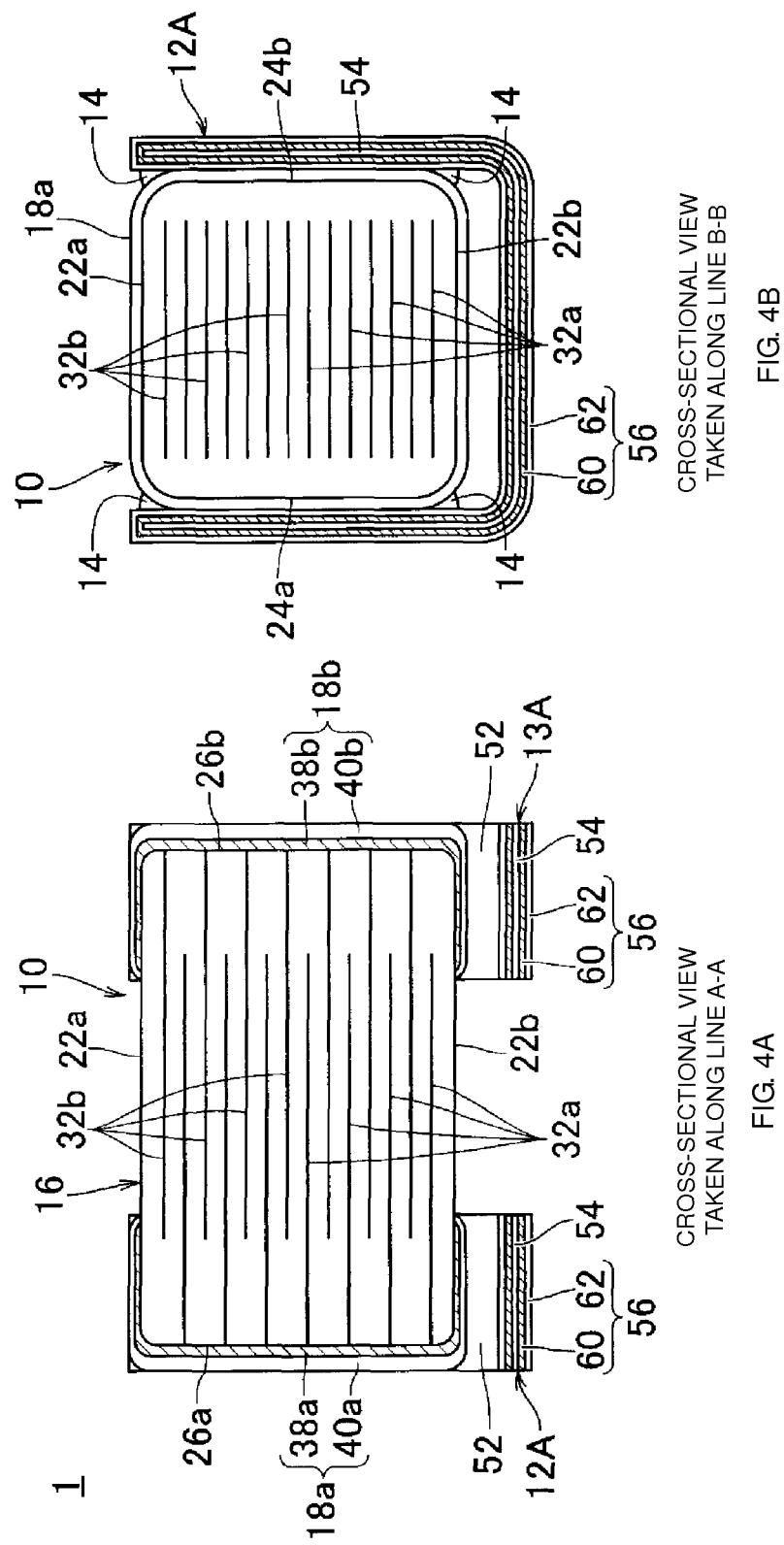
FIG. 4A is a cross-sectional view illustrating a cross-section taken along line A-A in FIG. 3.
FIG. 4B is a cross-sectional view illustrating a cross-section taken along line B-B in FIG. 3.
Figure 5:
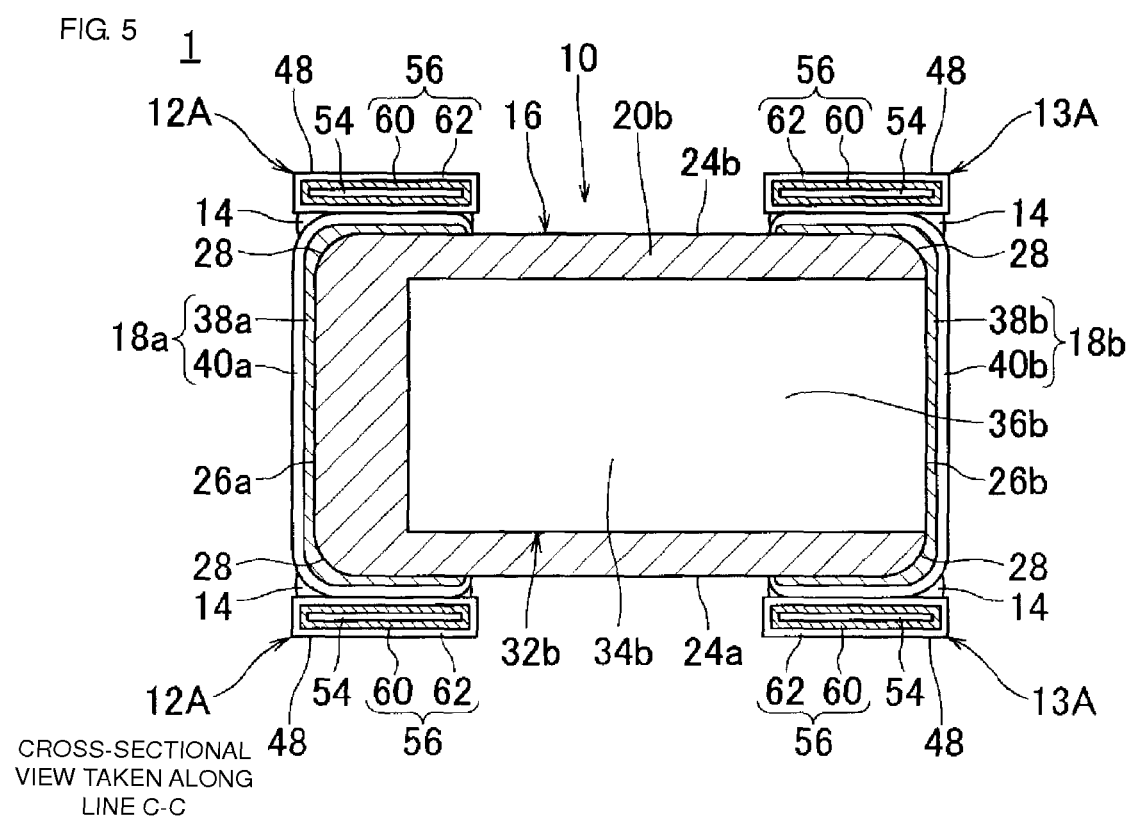
FIG. 5 is a cross-sectional view illustrating a cross-section taken along line C-C in FIG. 2.
Figure 6:
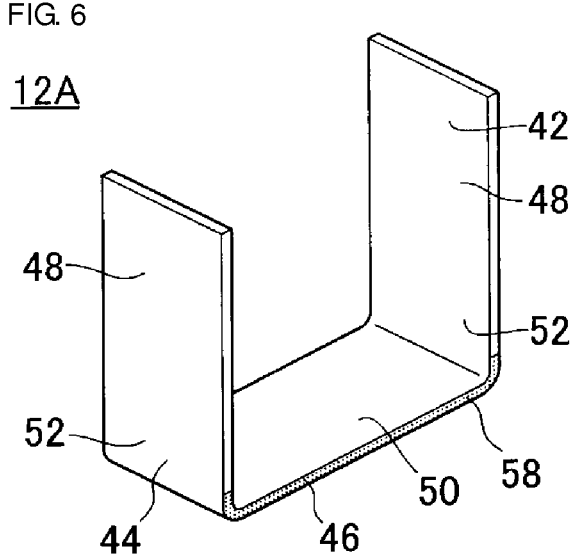
FIG. 6 is an external perspective view of a metal terminal that is used in the ceramic electronic component according to a preferred embodiment of the present invention, which is illustrated in FIG. 1.

An example of a preferred embodiment of a ceramic electronic component according to the present invention will be described. FIG. 1 is an external perspective view illustrating an example of a ceramic electronic component according to a preferred embodiment of the present invention, FIG. 2 is a side view illustrating an example of the ceramic electronic component according to a preferred embodiment of the present invention, and FIG. 3 is a top view illustrating an example of the ceramic electronic component according to a preferred embodiment of the present invention. FIG. 4A is a cross-sectional view illustrating a cross-section taken along line A-A in FIG. 3, and FIG. 4B is a cross-sectional view illustrating a cross-section taken along line B-B in FIG. 3. FIG. 5 is a cross-sectional view illustrating a cross-section taken along line C-C in FIG. 2. FIG. 6 is an external perspective view of a metal terminal that is used in the ceramic electronic component according to a preferred embodiment of the present invention, which is illustrated in FIG. 1. An electronic component body according to the present preferred embodiment is described with reference to a stacked ceramic capacitor as an example.

The ceramic electronic component 1 according to the present preferred embodiment includes an electronic component body 10 and a pair of metal terminals 12A and 13A. The electronic component body 10 and the pair of metal terminals 12A and 13A are connected to each other by a bonding member 14. In addition, the electronic component body 10 includes a ceramic element assembly (multilayer body), and first and second outer electrodes 18a and 18b that are provided on a surface of the ceramic element assembly 16.

The ceramic element assembly 16 preferably includes a plurality of stacked ceramic layers 20a and 20b. In addition, the ceramic element assembly 16 preferably has a rectangular or substantially rectangular parallelepiped shape, and includes a first main surface 22a and a second main surface 22b which extend along a longitudinal direction and a width direction, a first side surface 24a and a second side surface 24b which extend along a longitudinal direction and a height direction, and a first end surface 26a and a second end surface 26b which extend along the width direction and the height direction. The first main surface 22a and the second main surface 22b define a surface parallel or substantially parallel with a surface on which the ceramic electronic component 1 is mounted. In addition, it is preferable that corner portions 28 and ridge portions 30 of the ceramic element assembly 16 be rounded.

As ceramic layers 20a and 20b, a dielectric ceramic, which contains $BaTiO_3$, $CaTiO_3$, $SrTiO_3$, $CaZrO_3$, or the like as a main component, is preferably used, for example. In addition, a material, which is obtained by adding an auxiliary component such as a Mn compound, a Mg compound, a Si compound, a Co compound, a Ni compound, and a rare-earth compound to the main compound, may be used. In addition, it is preferable that the dielectric ceramic is constituted by ferroelectric ceramics to obtain a large electrostatic capacity.

A relative dielectric constant of the ferroelectric ceramics is preferably about 2000 or more, and more preferably about 3000 or more, for example. In this case, it is possible to realize an electrostatic capacity of, for example, about 1 μF or more or about 10 μF or more in a dimensional range of the above-described electronic component body 10. This ceramic electronic component 1 tends to generate acoustic noise and the present invention is appropriately applicable. The thickness of the ceramic layers 20a and 20b is preferably about 0.5 μm to about 10 μm, for example.

In addition, with regard to the ceramic element assembly 16 according to this preferred embodiment, a dielectric ceramic is preferably used, and thus the ceramic element assembly 16 functions as a capacitor, for example.

The ceramic element assembly 16 includes a plurality of first and second inner electrodes 32a and 32b that are interposed between a plurality of the ceramic layers 20a and 20b. The first and second inner electrodes 32a and 32b face each other through each of the ceramic layers 20a and 20b interposed therebetween, and electrical characteristics (for example, electrostatic capacity and the like) are generated by portions facing each other. In addition, the plurality of the first and second inner electrodes 32a and 32b may be disposed in parallel with or perpendicularly to a mounting surface so as to be interposed between the plurality of ceramic layers 20a and 20b. As a material of the first and second inner electrodes 32a and 32b, for example, Ni, Cu, Ag, Pd, a Ag—Pd alloy, Au, or the like may be used. The thickness of the first and second inner electrodes 32a and 32b preferably is about 0.3 μm to about 2.0 μm, for example. In addition, in a case where the electronic component body 10 is not a stacked type of component, the first and second inner electrodes 32a and 32b are not provided.

Each of the first inner electrodes 32a includes a facing portion 34a and an extension portion 36a. The facing portion 34a faces the second inner electrode 32b. The extension portion 36a extends from the facing portion 34a to the first end surface 26a of the ceramic element assembly 16. In addition, an end portion of the extension portion 36a of the first inner electrode 32a extends to the first end surface 26a of the ceramic element assembly 16 to be exposed thereto.

In addition, as is the case with the first inner electrode 32a, the second inner electrode 32b includes a facing portion 34a that faces the first inner electrode 32a, and an extension portion 36b that extends from the facing portion 34b to the second end surface 26b of the ceramic element assembly 12. An end portion of the extension portion 36b of the second inner electrode 32b extends to the second end surface 26b of the ceramic element assembly 16 to be exposed thereto.

On the first end surface 26a of the ceramic element assembly 16, the first outer electrode 18a is electrically connected to the first inner electrode 32a, and the first outer electrode 18a preferably covers the first end surface 26a and the first inner electrode 32a. In addition, the first outer electrode 18a preferably covers a portion of the first and second side surfaces 24a and 24b. Similarly, on the second end surface 26b of the ceramic element assembly 16, the second outer electrode 18b is electrically connected to the second inner electrode 32b, and the second outer electrode 18b preferably covers the second end surface 26b and the second inner electrode 32b. In addition, the second outer electrode 18b preferably covers a portion of the first and second side surfaces 24a and 24b.

The first outer electrode 18a includes a base layer 38a and a plated layer 40a that is located on a surface of the base layer 38a. In addition, the second outer electrode 18b includes a base layer 38b and a plated layer 40b that is located on a surface of the base layer 38b.

As a material of the base layers 38a and 38b, for example, Cu, Ni, Ag, Pd, a Ag—Pd alloy, Au, or the like may preferably be used. Among these, it is preferable to use a base metal such as Cu and Ni, for example. The base layers 38a and 38b may be co-fired simultaneously with the inner electrodes 32a and 32b, or may be post-fired after application of a conductive paste. In addition, the base layers 38a and 38b may be formed by direct plating, or may be formed by curing a conductive resin containing a thermosetting resin, for example. It is preferable that the thickness of the base layers 38a and 38b be about 10 μm to about 50 μm at the thickest portion, for example.

On the other hand, as a material of the plated layers 40a and 40b, for example, Cu, Ni, Ag, Pd, a Ag—Pb alloy, Au, or the like may be used. The plated layers 40a and 40b may be formed in a plurality of layers. A two-layer structure of Ni plating and Sn plating is preferable. The thickness of each of the plated layers 40a and 40b is preferably about 1 μm to about 10 μm, for example. In addition, a conductive resin layer for stress relaxation may be formed between the base layers 38a and 38b and the plated layers 40a and 40b.

The pair of metal terminals 12A and 13A are provided to mount the ceramic electronic component on the mounting substrate 1 and to significantly reduce or prevent vibration sound (acoustic noise). The metal terminal 12A preferably includes a first main surface 42 that is connected to the first outer electrode 18a at the position of the first and second side surfaces 24a and 24b of the ceramic element assembly 16, a second main surface 44 that is opposite to the first main surface 42, and a peripheral surface 46 which connects the first and second main surfaces 42 and 44 and defines the thickness of the metal terminal 12A. In addition, the metal terminal 13A preferably includes a first main surface 42 that is connected to the second outer electrode 18b at the position of the first and second side surfaces 24a and 24b of the ceramic element assembly 16, a second main surface 44 that is opposite to the first main surface 42, and a peripheral surface 46 which connects the first and second main surfaces 42 and 44 and defines the thickness of the metal terminal 13A. In addition, the pair of metal terminals 12A and 13A preferably have a U-shaped or substantially U-shaped cross-section.

For example, each of the pair of metal terminals 12A and 13A includes terminal bonding portions 48 that are connected to the first and second outer electrodes 18a and 18b at the position of the first and second side surfaces 24a and 24b of the ceramic element assembly 16, a mounting portion 50 that is provided to face the second main surface 22b of the ceramic element assembly 16, and extension portions 52, each being provided between each of the terminal bonding portions 48 and the mounting portion 50 to have a gap between the second main surface 22b of the ceramic element assembly 16 and the mounting portion 50.

Accordingly, the terminal bonding portions 48, the mounting portion 50, and the extension portions 52, which constitute each of the pair of metal terminals 12A and 13A preferably are integral with each other so as to define a single unitary member.

The terminal bonding portions 48 of the metal terminal 12A are portions which face the first and second side surfaces 24a and 24b of the ceramic element assembly 16 and which are connected to the first outer electrode 18a that is positioned on the first and second side surfaces 24a and 24b. In addition, the terminal bonding portions 48 of the metal terminal 13A are portions which face the first and second side surfaces 24a and 24b of the ceramic element assembly 16 and which are connected to the second outer electrode 18b that is positioned on the first and second side surfaces 24a and 24b. For example, the terminal bonding portions of the metal terminal 12A preferably are rectangular or substantially rectangular plate shaped having the same size or approximately the same size as the width of the first outer electrode 18a that is positioned on the first and second side surfaces 24a and 24b of the ceramic element assembly 16, and a first main surface 42 side of the metal terminal 12A is connected to the first outer electrode 18a with the bonding member 14. In addition, for example, the terminal bonding portions 48 of the metal terminal 13A preferably have a rectangular or substantially rectangular plate shape having the same size or approximately the same size as the width of the second outer electrode 18b that is positioned on the first and second side surfaces 24a and 24b of the ceramic element assembly 16, and a first main surface 42 side of the metal terminal 13A is connected to the second outer electrode 18b with the bonding member 14.

The mounting portion 50 of each of the pair of metal terminals 12A and 13A is provided to be connected to an electrode of the mounting substrate on which the ceramic electronic component 1 is mounted. The mounting portion 50 of each of the pair of metal terminals 12A and 13A is provided to face the second main surface 22b of the ceramic element assembly 16. The mounting portion 50 of the metal terminal 12A is preferably parallel or substantially parallel with the second main surface 22b between end portions of the extension portions 52A of the metal terminal 12A and perpendicular or substantially perpendicular to the extension portions 52. In addition, with regard to a bending direction of the mounting portion 50, the mounting portion 50 is bent toward the electronic component body 10. In addition, the mounting portion 50 of the metal terminal 13A preferably is parallel or substantially parallel with the second main surface 22b between end portions of the extension portions 52 of the metal terminal 13A and perpendicular or substantially perpendicular to the extension portions 52. In addition, with regard to a bending direction of the mounting portion 50, the mounting portion 50 is bent toward the electronic component body 10.

In addition, a corner portion, at which the extension portions 52 of each of the pair of metal terminals 12A and 13A and the mounting portion 50 of each of the pair of metal terminals 12A and 13A intersect at a right angle, may be rounded.

The extension portions 52 of the pair of metal terminals 12A and 13A are configured to provide a gap between the electronic component body 10 and the mounting substrate where the electronic component body 10 is mounted, and are portions that are not in contact with the mounting substrate but close to the mounting substrate. The extension portions 52 of each of the pair of metal terminals 12A and 13A are provided between the terminal bonding portions 48 and the mounting portion 50, respectively, to provide a gap between the second main surface 22b of the ceramic element assembly 16 and the mounting portion 50. In addition, the extension portions 52 of the pair of metal terminals 12A and 13A have, for example, a rectangular or a substantially rectangular plate shape, extend from the terminal bonding portions 48 in a mounting surface direction, that is, in a height direction perpendicular to the second main surface 22b, and are located in the same planes as the terminal bonding portions 48. Since the extension portions 52 are provided, a mechanical strain due to elastic deformation of the pair of metal terminals 12A and 13A, which is generated in the ceramic layers when an AC voltage is applied, is absorbed, and thus transmission of vibration caused by the strain to the mounting substrate through the first and second outer electrodes 18a and 18b is significantly reduced or prevented. As a result, it is possible to reduce generation of noise.

Each of the pair of metal terminals 12A and 13A includes a terminal body 54 and a plated film 56 that is located on a surface of the terminal body 54.

The terminal body 54 is preferably formed from Ni, Fe, Cu, Ag, Cr, or an alloy containing one or more of these metals as a main component. The terminal body 54 is preferably formed from Ni, Fe, Cr, or an alloy containing one or more of these metals as a main component.

Specifically, a metal of a base material of the terminal body 54 is preferably constituted by, for example, an Fe-42Ni alloy or an Fe-18Cr alloy. The reason for this preference is that an oxide film is typically formed on a surface of these metals, and thus wetting of Sn that is a main component of solder does not occur. In a preferred embodiment of the present invention, the terminal body 54 to which wetting of the solder does not occur is exposed. Accordingly, when mounting the ceramic electronic component 1 on the mounting substrate with the mounting solder, since wetting of the mounting solder to the pair of metal terminals 12A and 13A is significantly reduced or prevented, wetting of the mounting solder to the gap portion between the electronic component body 10 and each of the pair of metal terminals 12A and 13A is significantly reduced or prevented, and thus it is possible to prevent the gap portion of the pair of metal terminals 12A and 13A from being filled with the mounting solder. Accordingly, it is possible to sufficiently secure a space of the gap portion, and thus it is possible to significantly reduce or prevent transmission of vibration to the mounting substrate without hindering elastic deformation of the pair of metal terminals 12A and 13A. As a result, it is possible to significantly reduce or prevent generation of a vibration sound based on vibration of the mounting substrate due to a mechanical strain in the electronic component body 10 of the ceramic electronic component 1.

In addition, these metals have good corrosion resistance, and a difference in a coefficient of linear expansion with the ceramic element assembly 16 is small, and thus it is possible to prevent cracks from occurring in the ceramic element assembly 16 due to a thermal shock cycle and the like.

It is preferable that the thickness of the terminal body 54 be about 0.05 mm to about 0.2 mm, for example. In addition, when the terminal body 54 is formed from Ni, Fe, Cr, or an alloy containing one or more of these refractory metals as a main component, heat resistance of the first and second outer electrodes 18a and 18b is improved.

Here, a plating-removal portion 58 from which the plated film 56 is removed is preferably provided on the peripheral surface 46 of the mounting portion 50 and the extension portions 52 of the pair of metal terminals 12A and 13A. The plating-removal portion 58 is a portion in which a surface of the terminal body 54 is exposed. For example, the plated film 56 includes a lower-layer plated film 60 and an upper-layer plated film 62.

The lower-layer plated film 60 is provided on the terminal body 54, and the upper-layer plated film 62 is provided on the lower-layer plated film 60. In addition, each of the lower-layer plated film 60 and the upper-layer plated film 62 may be configured by a plurality of plated films. The lower-layer plated film 60 is preferably formed from Ni, Fe, Cu, Ag, Cr, or an alloy containing one or more of these metals as a main component. Each of the plurality of plated films of the lower-layer plated film 60 is preferably formed from Ni, Fe, Cr, or an alloy containing one or more of these metals as a main component. When the lower-layer plated film 60 is formed form Ni, Fe, Cr, or an alloy containing one or more of these refractory metals as a main component, heat resistance of the first and second outer electrodes 18a and 18b is improved. It is preferable that the thickness of the lower-layer plated film 60 is about 0.2 µm to about 5.0 µm, for example.

The upper-layer plated film 62 is preferably formed from Sn, Ag, Au, or an alloy containing one or more of these metals as a main component. The upper-layer plated film 62 is preferably formed from Sn or an alloy containing Sn as a main component. When the upper-layer plated film 62 is formed from Sn or an alloy containing Sn as a main component, solderability between the pair of metal terminals 12A and 13A and the first and second outer electrodes 18a and 18b is improved, respectively. It is preferable that the thickness of the upper-layer plated film 62 be about 1.0 μm to about 5.0 μm, for example. In addition, in a case where the plated film 56 is defined by only one layer, it is preferable that the upper-layer plated film 62 has good solderability.

The bonding member 14 is used to bond the first outer electrode 18a and the terminal bonding portion 48 of the metal terminal 12A. In addition, the bonding member 14 is used to bond the second outer electrode 18b and the terminal bonding portion 48 of the metal terminal 13A. For example, a Sn—Sb based, a Sn—Ag—Cu based, a Sn—Cu based, or a Sn—Bi based LF solder, and the like may be used for the bonding member 14. Particularly, in a case of the Sn—Sb based solder, it is preferable that the Sb content be about 5% to about 15%, for example.

In addition, as the bonding member 14, a conductive resin or a conductive adhesive may preferably be used.

According to the ceramic electronic component 1 of this preferred embodiment, since the plating-removal portion 58 from which the plated film 56 is removed is located on the peripheral surface 46 of the mounting portion 50 of the pair of metal terminals 12A and 13A, the surface of the terminal body 54 is exposed and the base material of the pair of metal terminals 12A and 13A is exposed. Accordingly, when mounting the ceramic electronic component 1 on the mounting substrate with the mounting solder, wetting of the mounting solder to the inner surface of the pair of metal terminals 12A and 13A is significantly reduced or prevented. Accordingly, wetting of the mounting solder to a portion (gap portion) between the electronic component body 10 and the pair of metal terminals 12A and 13A is significantly reduced or prevented, and thus it is possible to prevent the gap portion from being filled with the mounting solder. Accordingly, it is possible to sufficiently secure an area of the gap portion, and thus it is possible to significantly reduce or prevent transmission of vibration to the mounting substrate without hindering elastic deformation of the metal terminal. As a result, an effect of significantly reducing or preventing acoustic noise of the ceramic electronic component is reliably provided.

In addition, according to the ceramic electronic component 1 of this preferred embodiment, the plating-removal portion 58 from which the plated film 56 is removed is located on the peripheral surface 46 of the extension portions 52 of the pair of metal terminals 12A and 13A (since the plated film 56 is not formed on the peripheral surface of the mounting portion and the peripheral surface of the extension portion), and thus the surface of the terminal body 54 is exposed, and the base material of the pair of metal terminals 12A and 13A is exposed. The plated film 56 is not formed on the peripheral surface of not only the mounting portion 50 but also the extension portions 52. Accordingly, the mounting solder wetting to the pair of metal terminals 12A and 13A on a surface on a side opposite to the electronic component body 10 is also significantly reduced or prevented from wetting to the inner surface of the pair of metal terminals 12A and 13A from the extension portions 52 of the pair of metal terminals 12A and 13A. As a result, wetting of the mounting solder between the electronic component body 10 and the pair of metal terminals 12A and 13A (to gap portion) is further significantly reduced or prevented, and thus it is possible to make the above-described effect increase.

In addition, in a case of an L-shaped or substantially L-shaped metal terminal, there are three surfaces, which serve as the starting points of solder wetting during mounting (for example, surfaces perpendicular to the lower surface of the electronic component body in the mounting portion of the metal terminal, that is, so-called peripheral surfaces of the mounting portion), for each metal terminal. In contrast, in a case of a pair of U-shaped or substantially U-shaped metal terminals 12A and 13A similar to the pair of metal terminals 12A and 13A which are preferably used in the ceramic electronic component 1 according to this preferred embodiment, there are two surfaces, which serve as the starting points of solder wetting during mounting (for example, surfaces perpendicular to the lower surface of the electronic component body in the mounting portion of the metal terminal, that is, so-called peripheral surfaces of the mounting portion), for each metal terminal. Accordingly, in the case of the pair of metal terminals 12A and 13A of the pair of U-shaped or substantially U-shaped metal terminals 12A and 13A, the number of the surfaces serving as the start points of solder wetting is smaller in comparison to the case of the L-shaped or substantially L-shaped metal terminal in the related art. As a result, it is possible to significantly reduce or prevent wetting of the solder.

In addition, even when the wetting of mounting solder occurs, the number of the surfaces to which the wetting of the solder occurs is smaller in the pair of metal terminals 12A and 13A in comparison to the L-shaped or substantially L-shaped metal terminal, and thus the effect of significantly reducing or preventing wetting of the solder is well.

Next, another example of the ceramic electronic component 1 according to a further preferred embodiment of the present invention will be described.

Figure 7A:
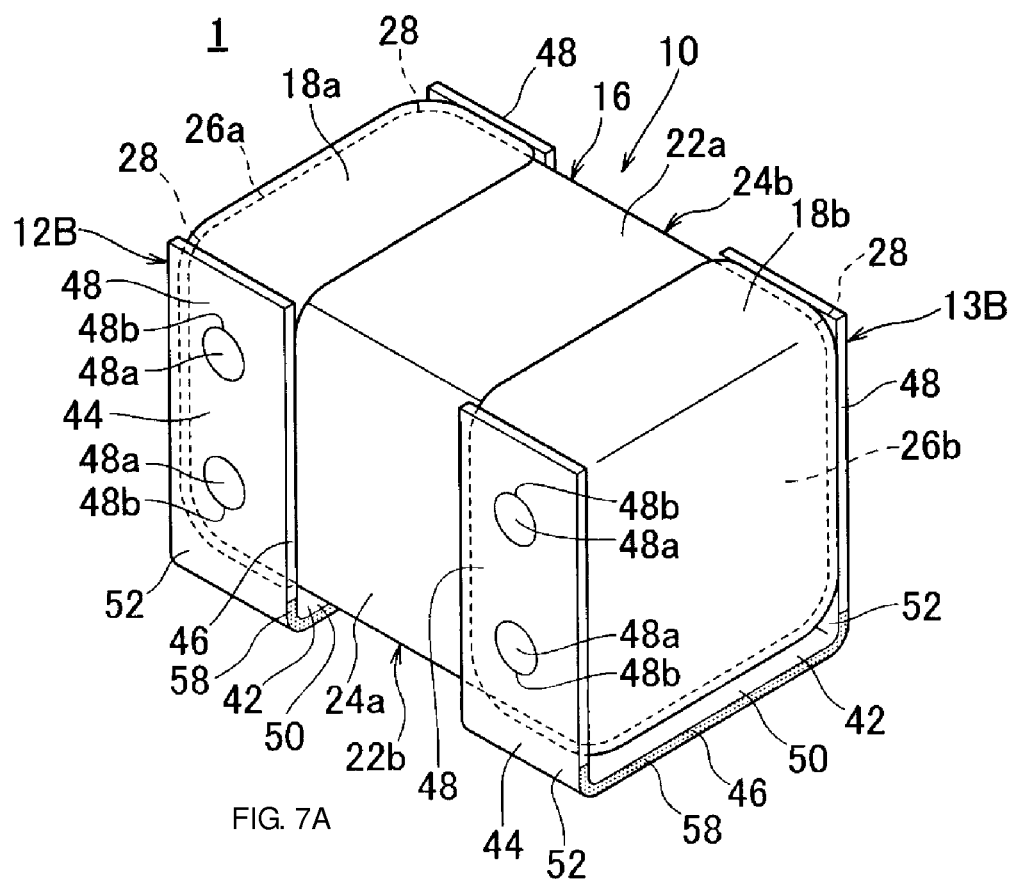
Figure 7B:
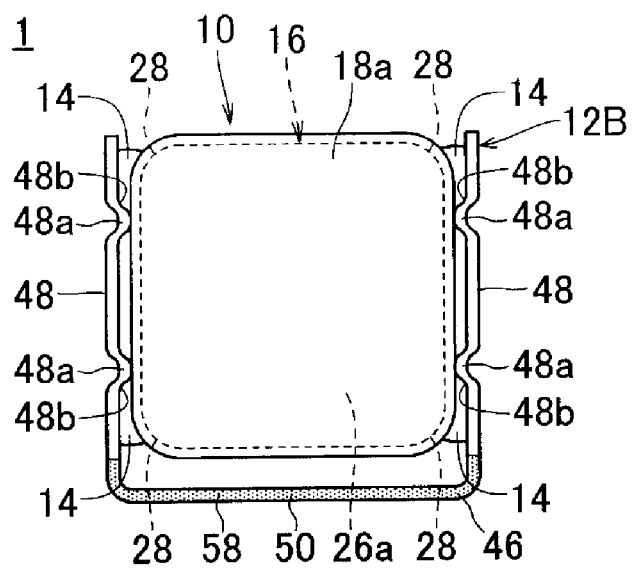
Figure 8:
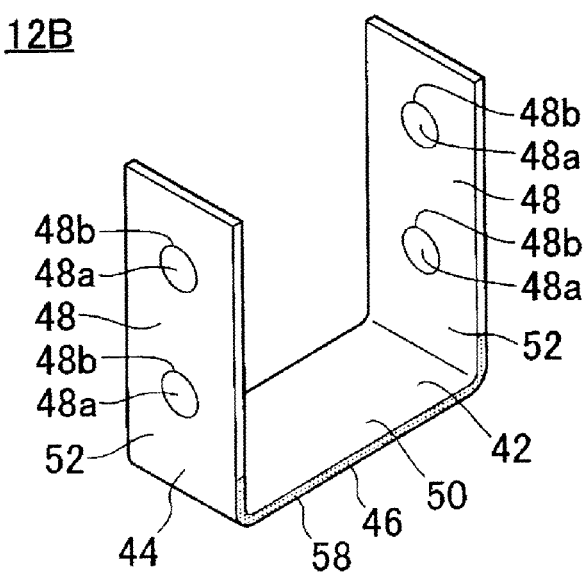
FIG. 8 is an external perspective view illustrating a first modification of the metal terminal that is used in the ceramic electronic component illustrated in FIGS. 7A and 7B.

FIGS. 7A and 7B illustrate another example of the ceramic electronic component according to a further preferred embodiment of the present invention, in which FIG. 7A is an external perspective view of the ceramic electronic component, and FIG. 7B is a front view of the ceramic electronic component. FIG. 8 is an external perspective view illustrating a first modification of the metal terminal that is used in the ceramic electronic component illustrated in FIGS. 7A and 7B. In addition, in FIGS. 7A and 7B, the same reference numerals are given to portions the same as those of the ceramic electronic component 1 illustrated in FIG. 1, and a description thereof will not be repeated. In addition, in FIG. 8, the same reference numerals are given to portions the same as those of the metal terminal 12A illustrated in FIG. 6, and a description thereof will not be repeated. In addition, a metal terminal 13B has the same structure as that of a metal terminal 12B, and thus a drawing thereof is not provided and a description thereof will not be repeated. This is true of FIGS. 9A to 18 in the following description.

Differently from the metal terminal 12A, in the metal terminal 12B illustrated in FIG. 8, protrusions 48a, which preferably have a convex shape in a direction of the first main surface 42, are provided on the terminal bonding portions 48. Peripheral portions 48b are provided at the periphery of the protrusions 48a. The protrusions 48a, the peripheral portions 48b, and the first outer electrode 18a are bonded to each other with the bonding member 14. The bonding member 14 is collected toward the protrusions 48a due to a capillary phenomenon. As a result, a gap is provided between the first outer electrode 18a and the metal terminal 12B.

The pair of metal terminals 12B and 13B exhibit the same operational effect as the pair of metal terminals 12A and 13A in combination with the following effect.

That is, a distance between the electronic component body 10 and the pair of metal terminals 12B and 13B becomes longer by the length of the protrusions 48a, and thus a gap is provided between each of the pair of metal terminals 12B and 13B and each of the first outer electrode 18a and the second outer electrode 18b. Accordingly, a layer of the bonding member 14 can be provided in the gap, thus obtaining a structure in which vibration of the electronic component body 10 is transmitted to the pair of metal terminals 12B and 13B through a layer (bonding layer) defined by the bonding member 14. As a result, transmission of vibration to the pair of metal terminals 12B and 13B is attenuated, and thus an effect of significantly reducing or preventing acoustic noise is obtained. In addition, the bonding member 14 may be solder to provide terminal bonding. However, the bonding member 14 may be a conductive resin or a conductive adhesive.

In addition, a region in which the bonding member 14 is not present may be provided in a bonding portion between the protrusions 48a. According to this, bonding between each of the pair of metal terminals 12B and 13B and each of the first outer electrode 18a and the second outer electrode 18b is divided, and thus transmission of vibration to the metal terminals is attenuated.

In addition, when an amount of the bonding member 14 is great, the bonding member 14 may spread to the extension portion 52 of each of the pair of metal terminals 12A and 13A. In this case, spring properties of the pair of metal terminals 12A and 13A may be reduced due to the bonding member 14 that spreads to the extension portion 52 of the pair of metal terminals 12A and 13A. Therefore, the effect of significantly reducing or preventing the acoustic noise is reduced. When the protrusions 48a are provided, the bonding member 14 is collected to the gap defined by the protrusions 48a due to a capillary phenomenon, and thus even when the amount of the bonding member 14 is much, spreading of the bonding member 14 to the extension portion 52 of the pair of metal terminals 12B and 13B is significantly reduced or prevented.

In addition, since the protrusions 48a are provided to the pair of metal terminals 12B and 13B, when inserting the electronic component body 10 into the pair of metal terminals 12B and 13B during a process of assembling the electronic component body 10, an opening (gap between the terminal bonding portions 48) is broadened, and thus it is possible to absorb a difference in a lateral size of the electronic component body 10.

In addition, retention in the vertical direction is performed by the protrusions 48a, and thus the electronic component body 10 is prevented from being detached during a reflow treatment when mounting the ceramic electronic component 1.

Next, still another example of the ceramic electronic component 1 according to a further preferred embodiment of the present invention will be described.

Figure 9A:
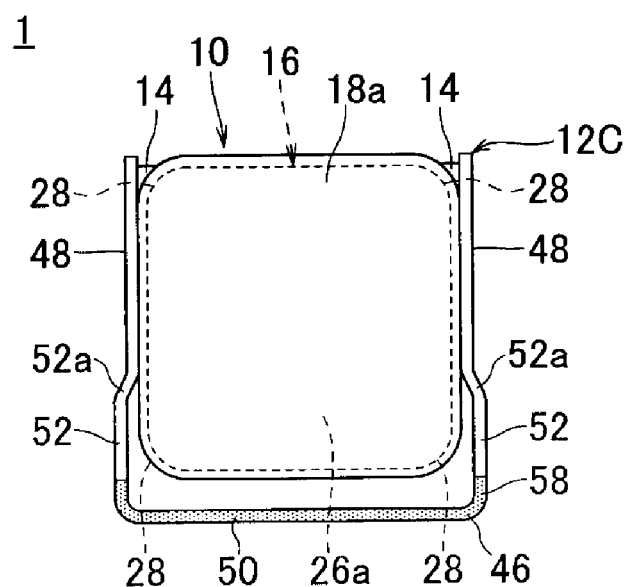
Figure 9B:
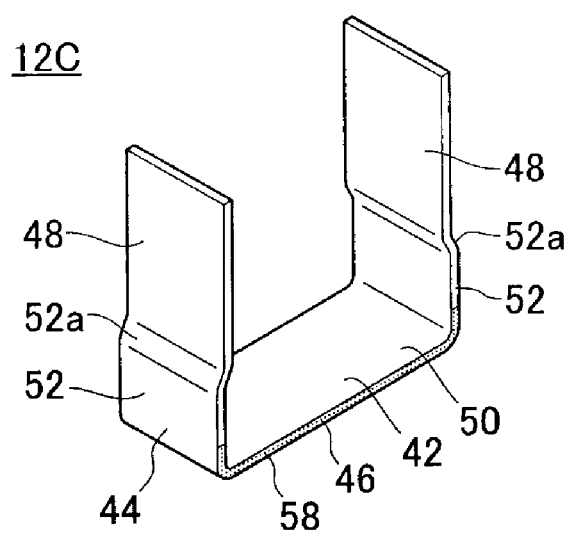
Figure 10A:
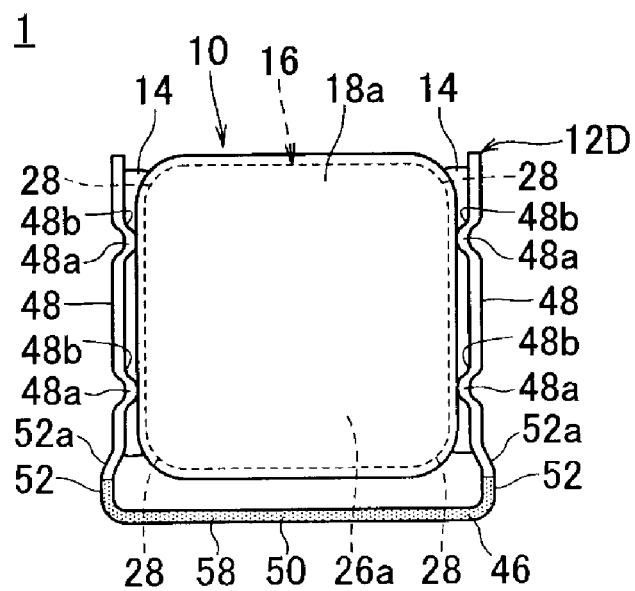
Figure 10B:
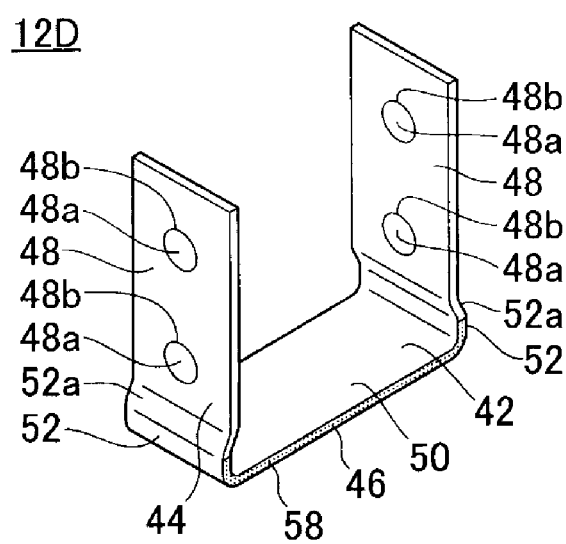

FIGS. 9A and 9B illustrate still another example of the ceramic electronic component according to a further preferred embodiment of the present invention, in which FIG. 9A is a front view of the ceramic electronic component, and FIG. 9B is an external perspective view illustrating a second modification of the metal terminal that is used in the ceramic electronic component illustrated in FIG. 9A. In addition, FIGS. 10A and 10B illustrate still another example of the ceramic electronic component according to yet another preferred embodiment of the present invention, in which FIG. 10A is a front view of the ceramic electronic component, and FIG. 10B is an external perspective view illustrating a third modification of the metal terminal that is used in the ceramic electronic component illustrated in FIG. 10A.

In a metal terminal 12C illustrated in FIGS. 9A and 9B, curved portions 52a, which are curved toward a direction extending away from the first side surface 24a or the second side surface 24b of a ceramic element assembly 16, are provided in the extension portions 52. In addition, in a metal terminal 12D illustrated in FIGS. 10A and 10B, protrusions 48a and curved portions 52a are provided on the first main surface 42 of the terminal bonding portions 48.

A pair of metal terminals 12C and 13C exhibit the same operational effect as the pair of metal terminals 12A and 13A in combination of the following effect.

That is, the curved portions 52a, which are curved toward a direction extending away from the first side surface 24a or the second side surface 24b of a ceramic element assembly 16, are provided at the extension portions 52 of the pair of metal terminals 12C and 13C, and thus a route of the extension portions 52 is lengthened with the same component height dimension of the ceramic electronic component 1. Accordingly, a vibration route from the electronic component body 10 is lengthened, and thus the effect of further significantly reducing or preventing acoustic noise can be obtained.

In addition, the pair of metal terminals 12D and 13D illustrated in FIGS. 10A and 10B exhibit the same operational effect as the pair of metal terminals 12A and 13A, the pair of metal terminals 12B and 13B, and the pair of metal terminals 12C and 13C.

Next, a fourth modification, a fifth modification, and a sixth modification of the metal terminal that are used in the ceramic electronic component 1 will be described.

Figure 11A:
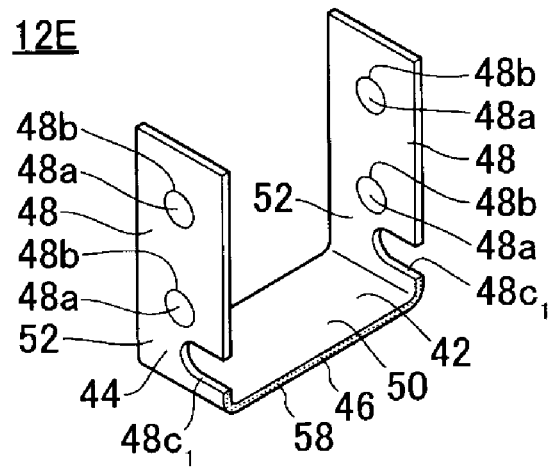
Figure 11B:
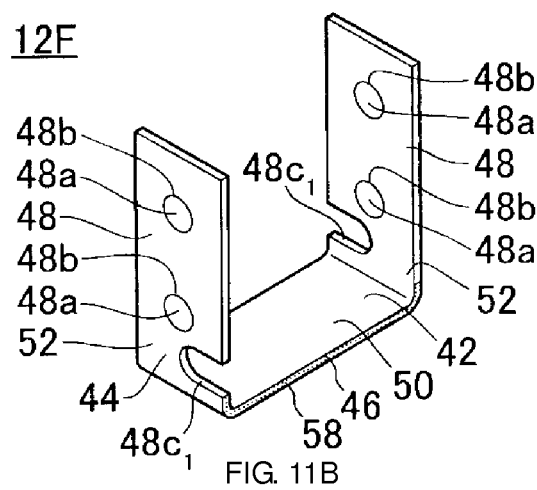
Figure 11C:
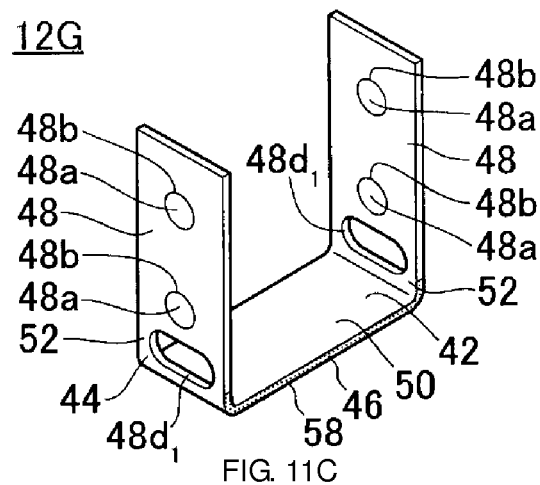

FIGS. 11A to 11C are external perspective views illustrating the metal terminal, in which FIG. 11A illustrates the fourth modification of the metal terminal, FIG. 11B illustrates the fifth modification of the metal terminal, and FIG. 11C illustrates the sixth modification of the metal terminal.

In a metal terminal 12E illustrated in FIG. 11A, notches $48c_1$ are provided in extension portions 52 in such a manner that openings are provided in the same direction. A metal terminal 12F illustrated in FIG. 11B is provided with notches $48c_1$ in such a manner that openings are provided in direction opposite to each other in the extension portions 52. In a metal terminal 12G illustrated in FIG. 11C, through-holes $48d_1$ are provided at the central portion of the extension portions 52. In addition, protrusions 48a are provided on the terminal bonding portions 48 of the metal terminals 12E to 12G illustrated in FIGS. 11A to 11C.

The pairs of the metal terminals 12E to 12G and 13E to 13G exhibit the same operational effect as the pair of metal terminals 12A and 13A and the pair of metal terminals 12B and 13B in combination with the following effect.

That is, the notches $48c_1$ are provided in the extension portions 52 of the pair of metal terminals 12E and 13E and the pair of the metal terminals 12F and 13F, and the through-holes $48d_1$ are provided in the pair of metal terminals 12G and 13G, and thus it is possible to reduce rigidity of the pairs of the metal terminals 12E to 12G and 13E to 13G. As a result, the effect of absorbing, by elastic deformation of the pair of metal terminals 12E to 12G and 13E to 13G, vibration based on the mechanical strain which is generated in the ceramic layers 20a and 20b of the ceramic electronic component 1 is further improved (that is, spring properties of the pairs of metal terminals 12E to 12G and 13E to 13G are further improved). Accordingly, it is possible to further improve the effect of suppressing acoustic noise.

In addition, the protrusions 48a are provided on the pair of metal terminals 12E to 12G, and 13E to 13G. However, there is no limitation thereto, and the protrusions 48a may not be provided. In addition, the shape of the notches $48c_1$ or the through-holes $48d_1$ is not particularly limited, and for example, a circular or substantially circular shape or an elliptical or substantially elliptical shape is also possible. In addition, there is no particular limitation to a site at which the notches $48c_1$ or the through-holes $48d_1$ are provided, and the notches $48c_1$ or the through-holes $48d_1$ may be provided in the extension portions 52, or may be provided across the edge of the extension portions 52.

Next, a seventh modification and an eighth modification of the metal terminal that is used in the ceramic electronic component 1 will be described.

Figure 12A:
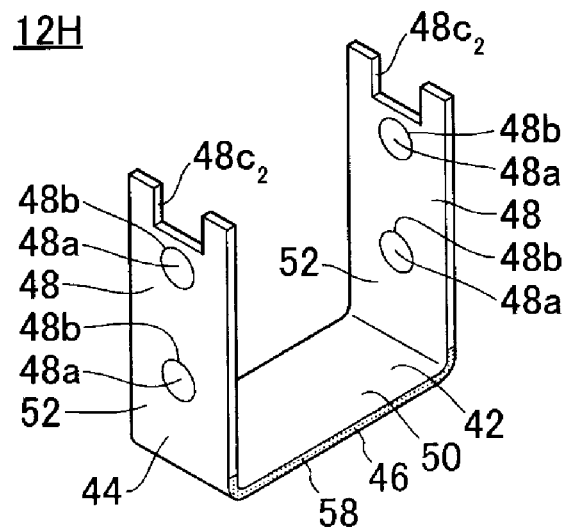
Figure 12B:
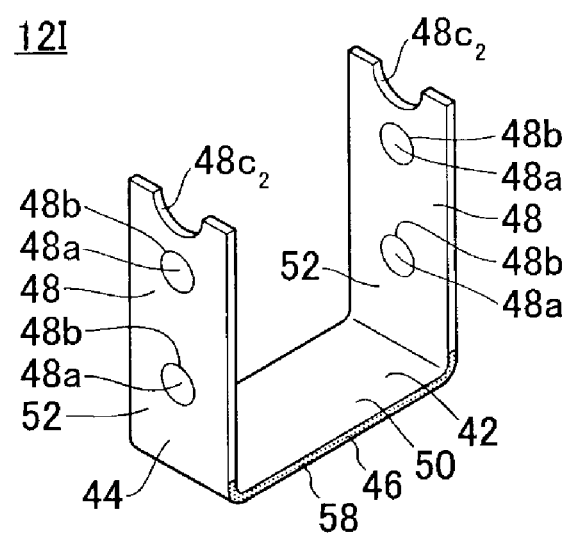

FIGS. 12A and 12B are external perspective views illustrating the metal terminal, in which FIG. 12A illustrates the seventh modification of the metal terminal, and FIG. 12B illustrates the eighth modification of the metal terminal.

In a metal terminal 12H illustrated in FIG. 12A and a metal terminal 12I illustrated in FIG. 12B, notches $48c_2$ are provided in the front end of the terminal bonding portions 48 (that is, an end portion on a side opposite to the end portion in which the extension portions 52 are provided in the terminal bonding portions 48). The notches $48c_2$ provided in the metal terminal 12H illustrated in FIG. 12A preferably has a rectangular or substantially rectangular shape, and the notches $48c_2$ provided in the metal terminals 12I illustrated in FIG. 12B are circular or substantially circular, for example.

The pair of metal terminals 12H and 13H and the pair of metal terminals 12I and 13I exhibit the same operational effect as the pair of metal terminals 12A and 13A and the pair of metal terminals 12B and 13B in combination with the following effect.

That is, when taping the electronic component body 10, it is necessary to arrange the electronic component bodies 10 by a component feeder in a taping machine. At this time, in a typical design, an upper surface and a lower surface of the electronic component body 10 preferably have the same shape and color as each other, and thus determination of a front side and a rear side in the component feeder may be difficult in some cases. Accordingly, in the electronic component body 10, when the notches $48c_2$ are provided in the front end of the terminal bonding portions 48 of the pair of metal terminals 12H and 13H or the pair of metal terminals 12I and 13I, a frictional resistance varies between a normal-direction state and an inverted state, and thus a difference in a transporting speed occurs. As a result, determination of a front side and a rear side becomes possible. In addition, with regard to a laterally turned component body, typically, a length in a width direction and a length in a height direction are different from each other in the electronic component body 10, and thus easy determination is possible. However, with regard to the determination of a front side and a rear side, since dimensions are not different from each other, the determination is performed using a color difference and the like. However, a detection error of a sensor usually occurs, and thus the determination is difficult.

In addition, since the notches $48c_2$ are preferably provided in the front end of the terminal bonding portions 48 of the pair of metal terminals 12H and 13H or the pair of metal terminals 12I and 13I, when bonding the electronic component body 10 and the pair of metal terminals 12H and 13H or the pair of metal terminals 12I and 13I with the bonding member 14, the bonding member 14 tends to be suctioned from the notches $48c_2$, and tends to enter a space between the electronic component body 10 and the pair of metal terminals 12H and 13H or the pair of metal terminals 12I and 13I during a reflow process. That is, the notches $48c_2$ serve as a passage of the solder for terminal bonding that is the bonding member 14. Accordingly, stable bonding between the electronic component body 10 and the metal terminals becomes possible.

In addition, the protrusions 48a are preferably provided on the pair of metal terminals 12H and 13H or the pair of metal terminals 12I and 13I. However, there is no limitation thereto, and the protrusions 48a may not be provided. In addition, the shape of the notches $48c_2$ is not particularly limited, and may be, for example, elliptical or substantially elliptical or a shape other than circular or substantially circular similar to the metal terminal 12I illustrated in FIG. 12B. In addition, there is no particular limitation on the location at which the notches $48c_2$ are provided, and the notches $48c_2$ may be provided in the extension portions 52, or may be provided across the edge of the extension portions 52.

Next, a ninth modification, a tenth modification, and an eleventh modification of the metal terminal that are used in the ceramic electronic component 1 will be described.

Figure 13A:
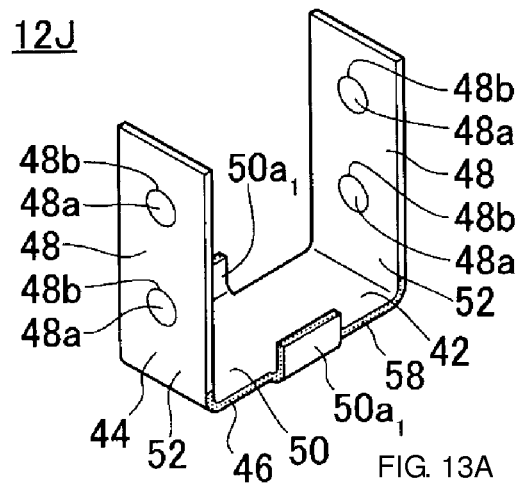
Figure 13B:
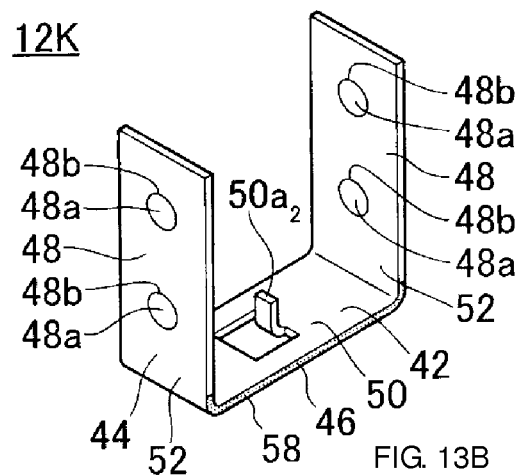
Figure 13C:
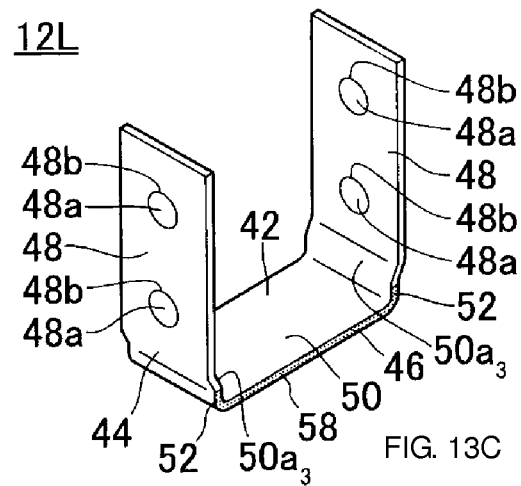

FIGS. 13A to 13C are external perspective views illustrating the metal terminal, in which FIG. 13A illustrates a ninth modification of the metal terminal, FIG. 13B illustrates a tenth modification of the metal terminal, and FIG. 13C illustrates an eleventh modification of the metal terminal.

In the mounting portion 50 of a metal terminal 12J illustrated in FIG. 13A, protrusions are provided on the central portions of end portions to which the extension portions 52 are not connected, such that supporting portions $50a_1$ are provided. The supporting portions $50a_1$ preferably are formed by pressing, for example, burring. In addition, in a metal terminal 12K illustrated in FIG. 13B, a protrusion is provided on the central portion in the mounting portion 50, such that a supporting portion $50a_2$ is formed. In addition, a metal terminal 12L that is illustrated in FIG. 13C is inwardly curved toward a direction of a side on which the electronic component body 10 is disposed on the extension portions 52 such that a width in a direction connecting both of the extension portions 52 of the metal terminals 12L becomes narrower than a width in a direction connecting both side surfaces of the electronic component body 10, such that supporting portions $50a_3$ are provided.

The pairs of metal terminals 12J to 12L and 13J to 13L exhibit the same operational effect as the pair of metal terminal 12A and 13A and the pair of metal terminal 12B and 13B in combination with the following effect.

That is, in the pair of metal terminals 12J and 13J or the pair of metal terminals 12K and 13K which are illustrated in FIGS. 13A and 13B, when mounting the ceramic electronic component 1 on the mounting substrate, even when the bonding member 14 is melted, the electronic component body 10 is retained by the supporting portions $50a_1$ or the supporting portions $50a_2$, and thus a gap amount preferably is secured. Accordingly, it is possible to prevent the electronic component body 10 from being detached from the pair of metal terminals 12J and 13J or the pair of metal terminals 12K and 13K.

In addition, in a case of bonding the electronic component body 10 and the pair of metal terminals 12J and 13J or the pair of metal terminals 12K and 13K to each other without using the bonding member 14, the electronic component body 10 and the pair of metal terminals 12J and 13J or the pair of metal terminals 12K and 13K are bonded to each other by the Sn plating of the first and second outer electrodes 18a and 18b and Sn of the plated films 56 of the pair of metal terminals 12J and 13J or the pair of metal terminals 12K and 13K. The first and second outer electrodes 18a and 18b have an outwardly convex curved shape, and thus a bonding area (in the outer electrodes, a flat surface portion of an end surface) that actually contributes to bonding is very narrow. In this case, the above-described effect due to the pair of metal terminals 12J and 13J or the pair of metal terminals 12K and 13K according to this modification is effectively exhibited.

In addition, even in a case of the pair of metal terminals illustrated 12L and 13L in FIG. 13C, even when the bonding member 14 is melted, the electronic component body 10 is retained by step portions of the supporting portions $50a_3$ which are formed when the pair of metal terminals 12L and 13L are inwardly curved in such a manner that a width in a direction connecting the extension portions 52 becomes narrower. Accordingly, a gap amount preferably is secured, and thus it is possible to prevent the electronic component body 10 from being detached from the pair of metal terminals 12L and 13L.

In addition, the protrusions 48a are provided on the pairs of metal terminals 12J to 12L and 13J to 13L. However, there is no limitation thereto, and the protrusions 48a may not be provided.

Next, a twelfth modification of the metal terminal that is used in the ceramic electronic component 1 will be described.

Figure 14:
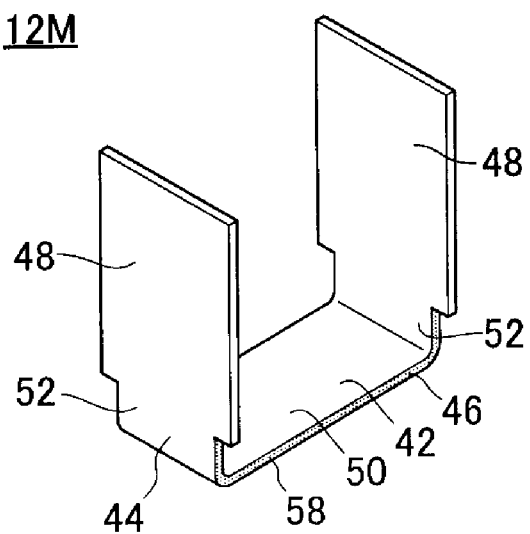
FIG. 14 is an external perspective view illustrating a twelfth modification of the metal terminal.

FIG. 14 is an external perspective view illustrating the twelfth modification of the metal terminal.

A metal terminal 12M illustrated in FIG. 14 is configured in such a manner that the width of the extension portions 52 and the mounting portion 50 in a longitudinal direction (direction connecting the first end surface 26a and the second end surface 26b) of the ceramic element assembly 16, is shorter than the width of the terminal bonding portions 48 of the metal terminal 12M in the longitudinal direction (direction connecting the first end surface 26a and the second end surface 26b) of the ceramic element assembly 16.

The pair of metal terminals 12M and 13M exhibit the same operational effect as the pair of metal terminals 12A and 13A in combination with the following effect.

That is, since the pair of metal terminals 12M and 13M are configured that the width of the extension portions 52 and the mounting portion 50 in the longitudinal direction (direction connecting the first end surface 26a and the second end surface 26b) of the ceramic element assembly 16 becomes shorter than the width of the terminal bonding portions 48 of the pair of metal terminals 12M and 13M in the longitudinal direction (direction connecting the first end surface 26a and the second end surface 26b) of the ceramic element assembly 16, it is possible to reduce the rigidity of the extension portions 52 which adsorb vibration of the electronic component body 10, and thus the effect of absorbing, by elastic deformation of the pair of metal terminals 12M and 13M, the mechanical strain which is generated in the ceramic layers 20a and 20b when an AC voltage is applied, is improved (that is, the spring properties of the pair of metal terminals 12M and 13M are improved). Accordingly, it is possible to improve the effect of significantly reducing or preventing acoustic noise of the ceramic electronic component 1.

In addition, in a case of the shape of the pair of metal terminals 12M and 13M, in the following manufacturing process of mounting the metal terminals on the electronic component body 10, it is possible to prevent the pair of metal terminals 12M and 13M from being laterally turned and inserted in a cavity (pocket) of a first transfer jig that suctions and retains the metal terminals during transferring of the metal terminals. However, it is necessary for the width of the terminal bonding portions 48 of the pair of metal terminals 12M and 13M in the longitudinal direction (direction connecting the first end surface 26a and the second end surface 26b) of the ceramic element assembly 16 to be larger than the size in the width of cavity of the following first transfer jig 64 (described later) that transfers the metal terminals 12M and 13M.

In addition, the protrusions 48a are not provided on the pair of metal terminals 12M and 13M. However, there is no limitation thereto, and the protrusions 48a may be provided. In this case, the same operational effect as the pair of metal terminals 12B and 13B is exhibited.

Next, a thirteenth modification of the metal terminal that is used in the ceramic electronic component 1 will be described.

Figure 15:
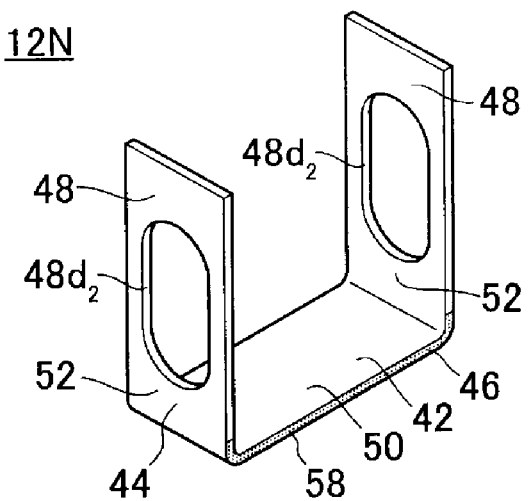
FIG. 15 is an external perspective view illustrating a thirteenth modification of the metal terminal.

FIG. 15 is an external perspective view illustrating the thirteenth modification of the metal terminal.

In a metal terminal 12N illustrated in FIG. 15, through-holes $48d_2$ are provided at the terminal bonding portions 48.

A pair of metal terminals 12N and 13N exhibit the same operational effect as the pair of metal terminals 12A and 13A in combination with the following effect.

That is, a portion of the terminal bonding portions 48 of the pair of metal terminals 12N and 13N is removed, and thus cracks in a ceramic are significantly reduced or prevented during a thermal shock cycle. A cause of the cracks during the thermal shock cycle is a stress caused by a difference in a coefficient of linear expansion between the metal terminals and the ceramic, and thus when a portion of the terminal bonding portions 48 of the pair of metal terminals 12N and 13N is removed like this modification, stress is significantly reduced or prevented.

In addition, in the pair of metal terminals 12N and 13N, the through-holes $48d_2$ are provided to the terminal bonding portions 48, but there is no limitation thereto. Even when a notch is provided, the same operational effect as the pair of metal terminals 12N and 13N is exhibited.

Next, a fourteenth modification and a fifteenth modification of the metal terminal that are used in the ceramic electronic component 1 will be described.

Figure 16A:
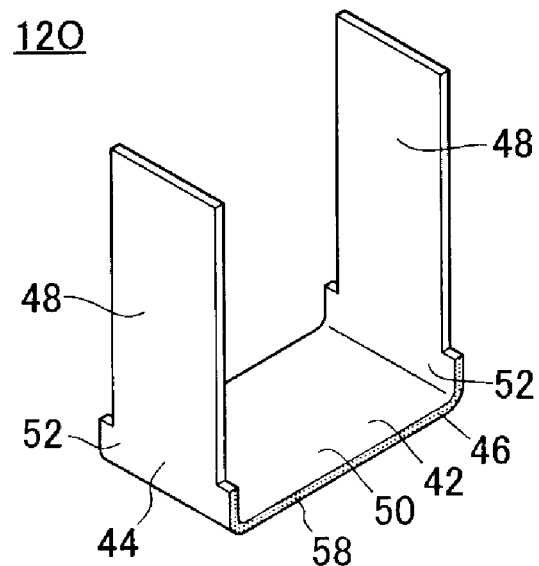
Figure 16B:
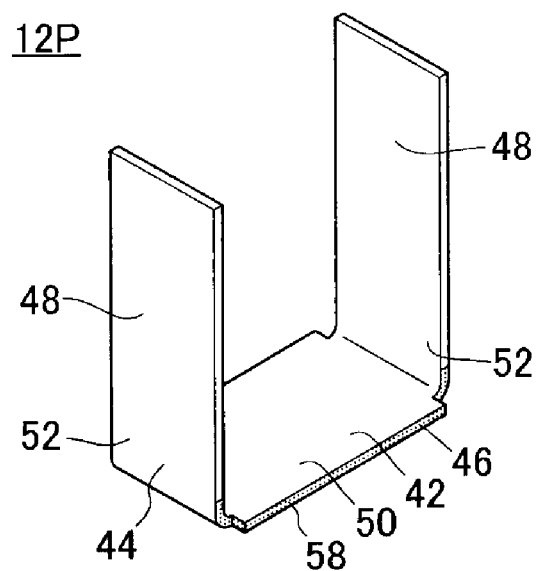

FIGS. 16A and 16B are external perspective views illustrating the metal terminal, in which FIG. 16A illustrates the fourteenth modification of the metal terminal, and FIG. 16B illustrates the fifteenth modification of the metal terminal.

A metal terminal 12O illustrated in FIG. 16A or a metal terminal 12P illustrated in FIG. 16B is configured such that a width of the mounting portion 50 in the longitudinal direction (direction connecting the first end surface 26a and the second end surface 26b) of the ceramic element assembly 16 becomes longer than a width of the terminal bonding portions 48 of the metal terminals 12O and 12P in the longitudinal direction (direction connecting the first end surface 26a and the second end surface 26b). That is, the metal terminals 12O and 12P are configured such that the width of the mounting portion 50 in the longitudinal direction (direction connecting the first end surface 26a and the second end surface 26b) of the ceramic element assembly 16 becomes longer than a width of a land electrode provided on the mounting substrate.

The pair of metal terminals 12O and 13O or the pair of metal terminals 12P and 13P have the same operational effect as the pair of metal terminals 12A and 13A in combination with the following effect.

That is, when mounting the ceramic electronic component 1 on the mounting substrate with mounting solder, if the wetting of mounting solder occurs between the electronic component body 10 and the metal terminal, that is, if wetting of the mounting solder to the surface of the mounting portion 50 of the metal terminals 12A and 13A, which extends in parallel with the mounting substrate and is mounted on the mounting substrate, on a side facing the electronic component body 10, and to the surface of the extension portions 52 of the metal terminals 12A and 13A, which extend perpendicularly to the mounting substrate, on a side facing the end surface of the electronic component body 10 occurs, a space between the electronic component body 10 and the metal terminals, which is a gap portion, is filled. Therefore, the intrinsic function (spring function) of the metal terminals, which significantly reduces or prevents transmission of vibration of the electronic component body 10, may be reduced. However, when mounting the ceramic electronic component 1 on the mounting substrate, since the width of the mounting portion 50 of the pair of metal terminals 12O and 13O or the pair of metal terminals 12P and 13P is longer than the width of the land electrode of the mounting substrate, wetting of the mounting solder to an inner side (onto a surface facing the electronic component body 10) of the mounting portion 50 of the pair of metal terminals 12O and 13O or the pair of metal terminals 12P or 13P is significantly reduced or prevented. Accordingly, a space portion (that is, a gap amount) is sufficiently provided between the electronic component body 10 and the mounting portion 50, and thus the effect of significantly reducing or preventing acoustic noise is sufficiently and stably exhibited.

In addition, the protrusions 48*a* are not provided on the pair of metal terminals 12O and 13O or the pair of metal terminals 12P and 13P. However, there is no limitation thereto, and the protrusions 48*a* may be provided. In this case, the pair of metal terminals 12O and 13O or the pair of metal terminals 12P and 13P exhibit the same operational effect as the pair of metal terminals 12B and 13B.

Next, a sixteenth modification and a seventeenth modification of the metal terminal that are used in the ceramic electronic component 1 will be described.

Figure 17A:
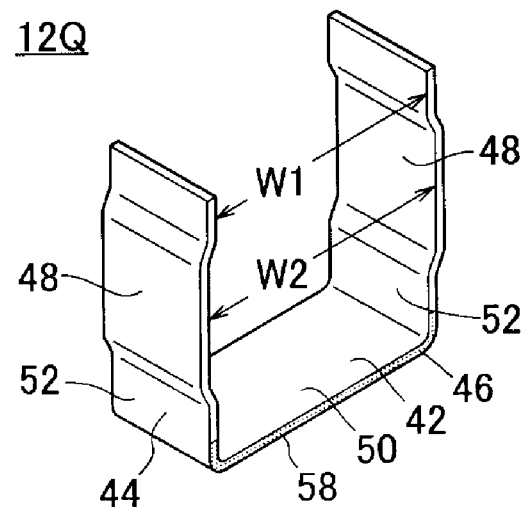
Figure 17B:
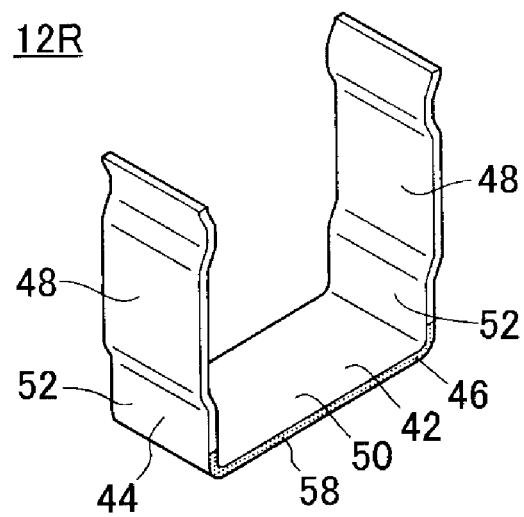

FIGS. 17A and 17B are external perspective views illustrating the metal terminal, in which FIG. 17A illustrates the sixteenth modification of the metal terminal, and FIG. 17B illustrates the seventeenth modification of the metal terminal.

A metal terminal 12Q illustrated in FIG. 17A is configured such that a distance W1 between the terminal bonding portions 48 of the metal terminal 12Q other than a portion connected to the electronic component body 10, and a distance W1 between the extension portions 52 of the metal terminal 12Q become shorter than a distance W2 between the terminal bonding portions of the metal terminal 12Q at a portion connected to the electronic component body 10 so as to be shorter than a length connecting the first side surface 24*a* and the second side surface 24*b* of the ceramic element assembly 16. In addition, the shape of curved portions in which the distance between the terminal bonding portions 48 of the metal terminal 12Q and the distance between the extension portions 52 of the metal terminal 12Q become shorter corresponds to the shape of ridge portions 30 of the first and second outer electrodes 18*a* and 18*b* of the electronic component body 10 that is retained.

In addition, a metal terminal 12R illustrated in FIG. 17B preferably has the same configuration. In addition, differently from the metal terminal 12Q, front ends of the terminal bonding portions 48 of the metal terminal 12R illustrated in FIG. 17B are curved toward an outer side, respectively.

Accordingly, when the metal terminals 12Q and 12R are configured as described above, the electronic component body 10 may be inserted between the terminal bonding portions 48 of the metal terminals 12Q and 12R at a portion connected to the electronic component body 10. As a result, the electronic component body 10 is retained by the metal terminals 12Q and 12R.

The pair of metal terminals 12Q and 13Q or the pair of metal terminals 12R and 13R have the same operational effect as the pair of metal terminals 12A and 13A in combination with the following effect.

That is, the distance between the terminal bonding portions 48 at a portion other than a portion connected to the electronic component body 10 and the extension portions 52 is shorter than the distance between the terminal bonding portions 48 at a portion connected to the electronic component body 10 so as to be shorter than a length connecting the first side surface 24*a* and the second side surface 24*b* of the electronic component body 10, and thus a bonding area to bond the electronic component body 10 is secured. Accordingly, fixing strength of the metal terminals with respect to the electronic component body 10 is secured, and it is possible to endure a mounting load during mounting of the ceramic electronic component 1. In addition, the electronic component body 10 is inserted between the pair of metal terminals 12Q and 13Q or the pair of metal terminals 12R and 13R, and thus this modification is applicable to bonding without using the solder for terminal bonding.

In addition, in the pair of metal terminals 12R and 13R, the front ends of the terminal bonding portions 48 of the pair of metal terminals 12R and 13R are curved toward an outer side, respectively, and thus the gap between the front ends of the terminal bonding portions 48 is broadened. Accordingly, it is easy to insert the electronic component body 10 between the metal terminals 12R and 13R.

Next, an eighteenth modification of the metal terminal that is used in the ceramic electronic component 1 will be described.

Figure 18:
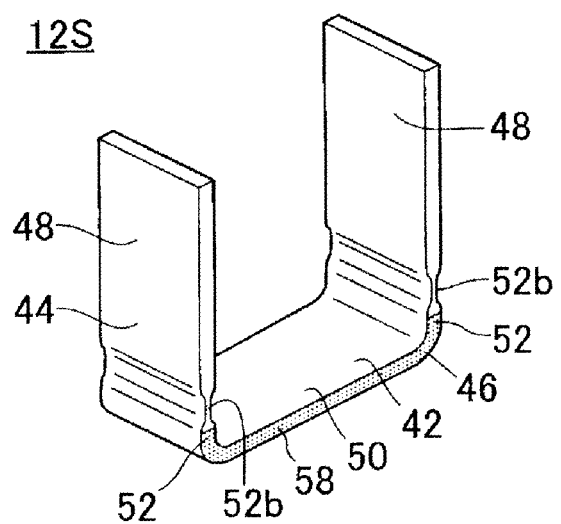
FIG. 18 is an external perspective view illustrating an eighteenth modification of the metal terminal.

FIG. 18 is an external perspective view illustrating the eighteenth modification of the metal terminal.

In a metal terminal 12S illustrated in FIG. 18, thin portions 52*b*, which have a thickness smaller than other portions, are provided at a portion of the extension portions 52.

A pair of metal terminals 12S and 13S illustrated in FIG. 18 have the same operational effect as the pair of metal terminals 12A and 13A in combination with the following effect.

That is, in the pair of metal terminals 12S and 13S, the thin portions 52*b*, which have a thickness smaller than other portions, are provided at a portion of the extension portions 52, and thus it is possible to reduce the rigidity of the pair of metal terminals 12S and 13S, and thus the effect of absorbing, by elastic deformation of the pair of metal terminals 12S and 13S, the mechanical strain which is generated in the ceramic layers 20*a* and 20*b* when an AC voltage is applied, is improved (that is, the spring properties of the pair of metal terminals 12S and 13S are improved). Accordingly, it is possible to improve the effect of significantly reducing or preventing acoustic noise of the ceramic electronic component 1.

In addition, the protrusions 48*a* are not provided on the pair of metal terminals 12S and 13S. However, there is no limitation thereto, and the protrusions 48*a* may be provided. In this case, the pair of metal terminals 12S and 13S exhibit the same operational effect as the pair of metal terminals 12B and 13B.

Subsequently, a preferred embodiment of a method of manufacturing a ceramic electronic component configured as described above will be described with reference to the ceramic electronic component 1 as a non-limiting example.

First, a ceramic green sheet, conductive paste for inner electrodes which defines the inner electrodes 32*a* and 32*b*, and a conductive paste for outer electrodes which defines the first and second outer electrodes 18*a* and 18*b* are prepared. In addition, an organic binder and a solvent are contained in the ceramic green sheet, the conductive paste for inner electrodes, and the conductive paste for outer electrodes, but an organic binder and an organic solvent, which are known, may be used.

In addition, for example, the conductive paste for inner electrodes is printed on the ceramic green sheet in a predetermined pattern, thus forming an inner electrode pattern on the ceramic green sheet. In addition, the conductive paste for inner electrodes may be printed by a known method such as screen printing.

Next, a predetermined number of ceramic green sheets for an outer layer, on which the inner electrode pattern is not printed, are stacked, and then ceramic green sheets on which the inner electrode pattern is printed are sequentially stacked thereon, and then a predetermined number of ceramic green sheets for an outer layer are stacked thereon, thus preparing a mother multilayer body. The mother multilayer body may be compressed in a stacking direction by isostatic press or the like as necessary.

The mother multilayer body is cut out in a predetermined shape dimension to cut out a green ceramic multilayer body. At this time, corner portions or ridge portions of the multilayer body may be rounded by barrel polishing or the like. Subsequently, the green ceramic multilayer body that is cut out is fired to produce a ceramic element assembly that is a multilayer body. In addition, a firing temperature of the green ceramic multilayer body depends on a ceramic material or a material of the conductive paste for inner electrodes, but the firing temperature is preferably about 900° C. to about 1300° C., for example.

Next, the conductive paste for outer electrodes is applied onto both end surfaces of the fired ceramic element assembly by, for example, dipping, and then the conductive paste is fired to form the base layers 38a and 38b of the first and second outer electrodes 18a and 18b. A firing temperature is preferably about 700° C. to about 900° C., for example. In addition, the plated layers 40a and 40b are formed on the surface of the base layers 38a and 38b as necessary. In addition, for example, firing of the conductive paste for outer electrodes and firing of the green ceramic multilayer body are performed in the air, an atmosphere of $N_2$, an atmosphere of water vapor+$N_2$, or the like. In addition, the dipping is an application method of immersing the ceramic element assembly in the conductive paste for outer electrodes to form the outer electrodes in the ceramic element assembly.

Figure 19:
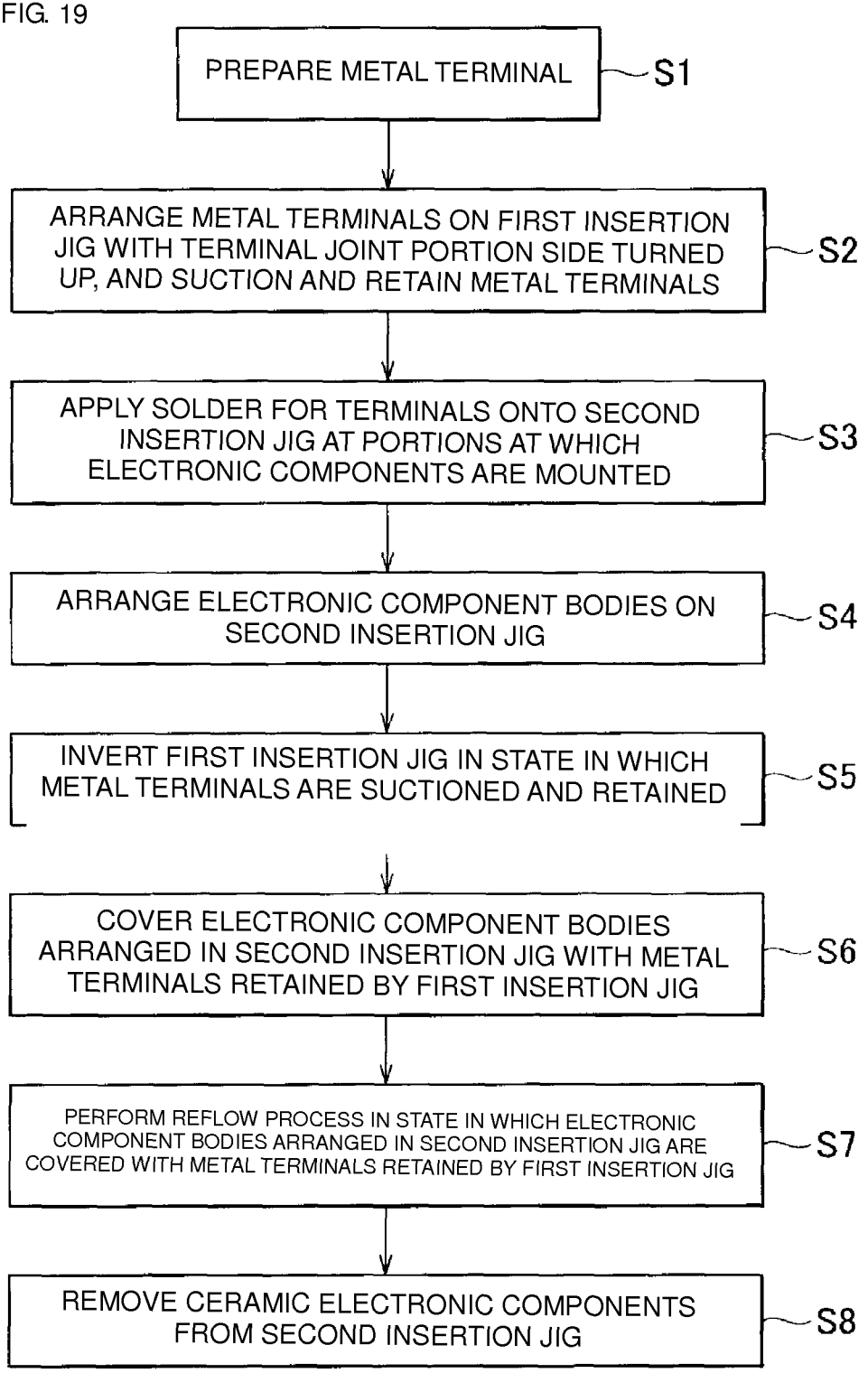
FIG. 19 is a flowchart illustrating a method of mounting the metal terminal on an electronic component body.

Subsequently, a process of mounting the metal terminal in the method of manufacturing the ceramic electronic component according to a preferred embodiment of the present invention will be described. FIG. 19 is a flowchart illustrating the method of mounting the metal terminal on the electronic component body. Hereinafter, details of the method will be described.

Figure 20:
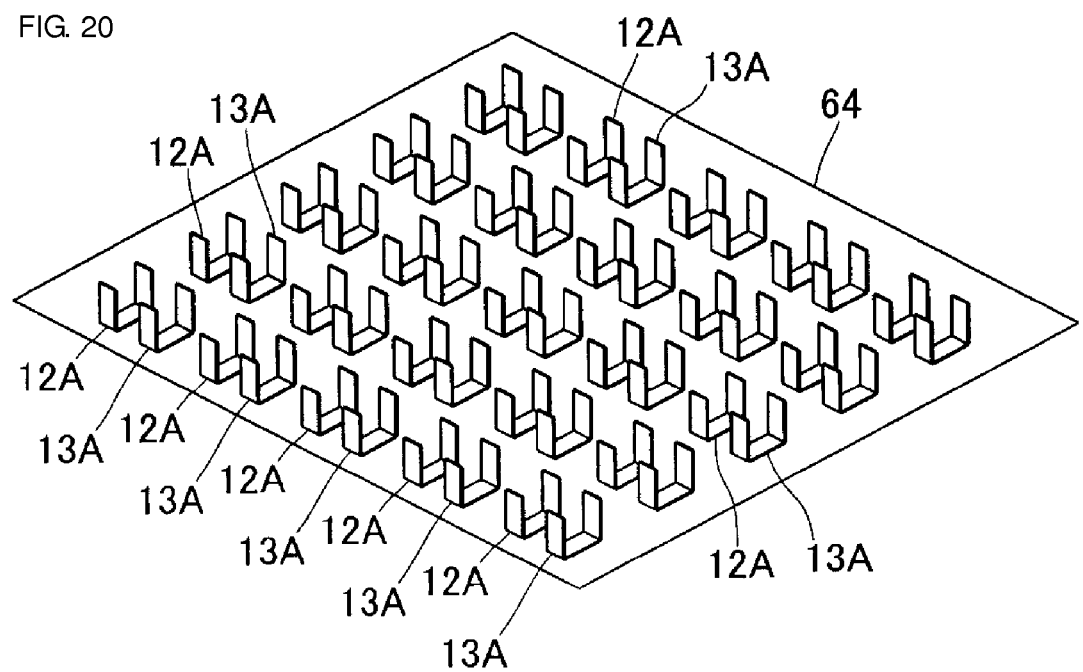
FIG. 20 is a perspective view illustrating a state in which the metal terminal is suctioned onto and retained by a first transfer jig in the method of mounting the metal terminal.
Figure 21:
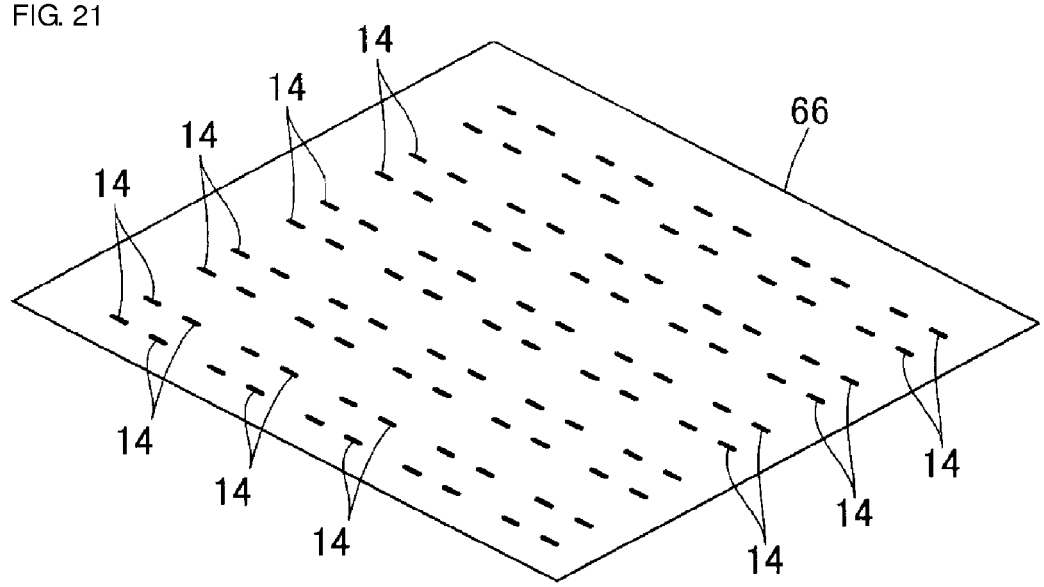
FIG. 21 is a perspective view illustrating a state in which solder for terminal bonding is applied onto a second transfer jig in the method of mounting the metal terminal.
Figure 22:
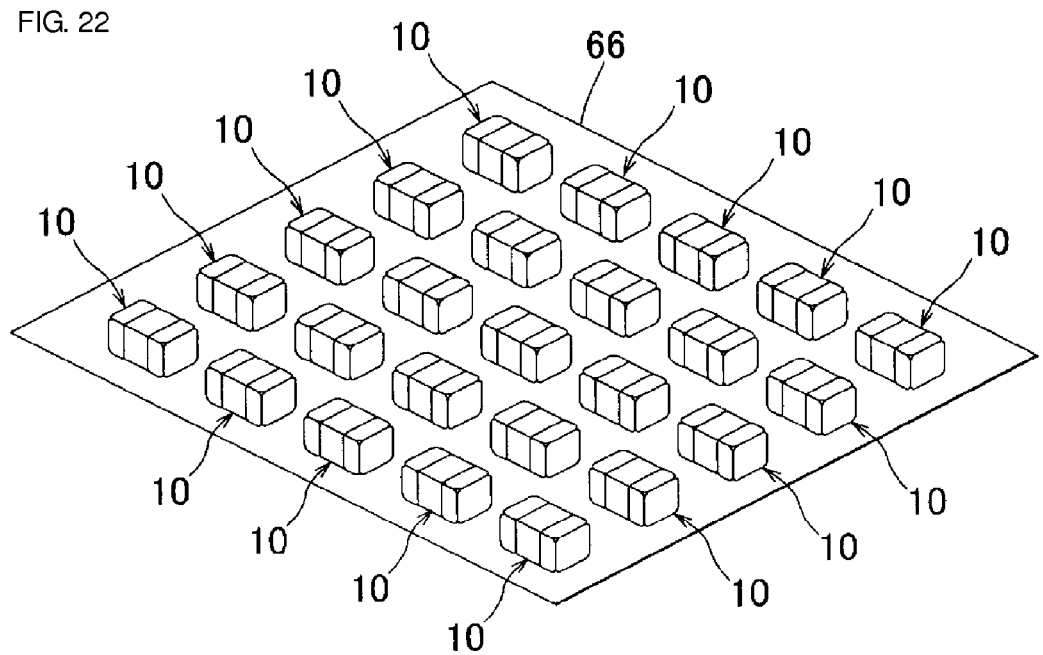
FIG. 22 is a perspective view illustrating a state in which the electronic component body is arranged in the second transfer jig in the method of mounting the metal terminal.
Figure 23:
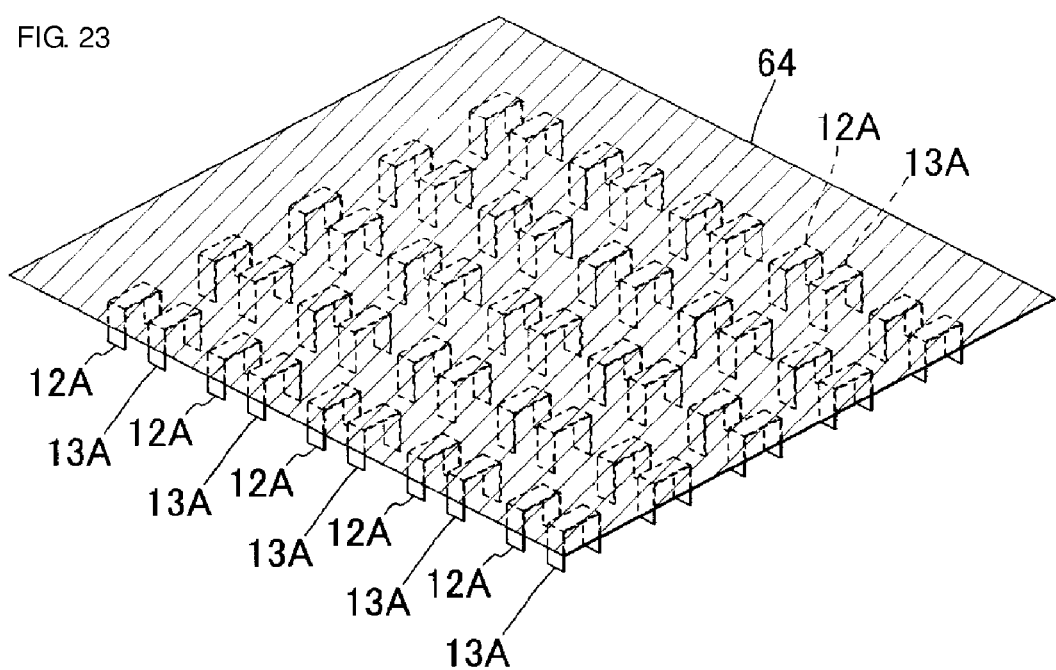
FIG. 23 is a perspective view illustrating a state in which the first transfer jig is inverted in the method of mounting the metal terminal.
Figure 24:
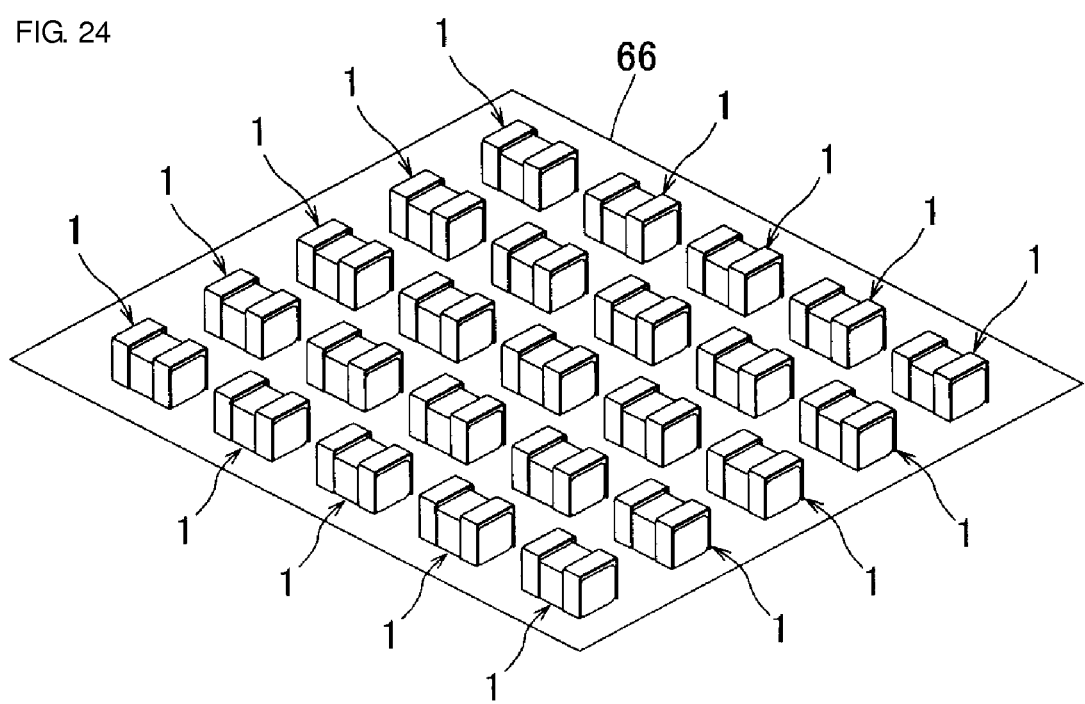
FIG. 24 is a perspective view illustrating a state of performing a reflow process in a state in which the electronic component body arranged in the second transfer jig is covered with the metal terminal retained by the first transfer jig in the method of mounting the metal terminal.

FIG. 20 is a perspective view illustrating a state in which the metal terminals are suctioned onto and retained by a first transfer jig in the method of mounting the metal terminal. FIG. 21 is a perspective view illustrating a state in which solder for terminal bonding is applied onto a second transfer jig in the method of mounting the metal terminals. FIG. 22 is a perspective view illustrating a state in which the electronic component bodies are arranged in the second transfer jig in the method of mounting the metal terminal. FIG. 23 is a perspective view illustrating a state in which the first transfer jig is inverted in the method of mounting the metal terminal. FIG. 24 is a perspective view illustrating a state of performing a reflow process in a state in which the electronic component bodies arranged in the second transfer jig are covered with the metal terminals retained by the first transfer jig in the method of mounting the metal terminal.

First, in step S1, a plurality of pairs of metal terminals 12A and 13A including the plated films 56a and 56b are prepared.

That is, each of the pairs of the metal terminals 12A and 13A is prepared as follows. After forming the plated film 56 on the terminal body 54, the plated film 56 on a peripheral surface 46 of the pair of metal terminals 12A and 13A is removed by a mechanical manner (grinding and polishing), or the plated film 56 of the pair of metal terminals 12A and 13A is removed by a removal method using laser trimming or a plating peeling agent (for example, sodium hydroxide). In addition, as a method of removing the plated film 56, the following method may be used. Specifically, a portion, at which plating is not performed, is covered with a resist before forming the plated film 56 of the pair of metal terminals 12A and 13A, and the resist is removed after forming a plated film on the pair of metal terminals 12A and 13A.

Next, in step S2, as illustrated in FIG. 20, the metal terminals 12A and 13A are arranged on the first transfer jig 64 with the terminal bonding portions 48 turned up, and the metal terminals 12A and 13A are suctioned onto and retained by the first transfer jig 64.

Subsequently, in step S3, as illustrated in FIG. 21, solder for terminal bonding as the bonding member 14 is applied in advance to positions at which the electronic component bodies 10 are mounted on the second transfer jig 66 by screen printing.

Next, in step S4, as illustrated in FIG. 22, the electronic component bodies 10 are arranged on the second transfer jig.

In addition, in step S5, as illustrated in FIG. 23, the first transfer jig 64 is inverted in a state in which the plurality of metal terminals 12A and 13A that are prepared are suctioned and retained.

Next, in step S6, as illustrated in FIG. 24, the electronic component bodies 10 arranged on the second transfer jig 66 are covered with the pair of metal terminals 12A and 13A that are retained by the first transfer jig 64. In addition, in step S7, a reflow process is performed in a state in which the electronic component bodies 10 arranged on the second transfer jig are covered with the pair of metal terminals 12A and 13A retained by the first transfer jig 64.

In addition, when mounting the pair of metal terminals 12A and 13A, it is preferable that a reflow temperature during soldering by the bonding member 14 be set to about 270° C. to about 290° C., and heat be applied for about 30 seconds or longer, for example.

The solder for terminal bonding as the bonding member 14 is suctioned between the first and second outer electrodes 18a and 18b and the pair of metal terminals 12A and 13A by a capillary phenomenon and is filled therebetween during the reflow process in step S7, and thus the pair of metal terminals 12A and 13A and the first and second outer electrodes 18a and 18b are bonded to each other through the solder for terminal bonding.

In addition, when using metal terminals having the same shape as the metal terminals in the sixteenth modification and the seventeenth modification, the pair of metal terminals retain the electronic component body 10, and the pair of metal terminals are connected to the first and second outer electrodes 18a and 18b without using the solder for terminal bonding as the bonding member 14. In this case, the electronic component body 10 is retained by elasticity of the metal terminals.

Finally, in step S8, the ceramic electronic components are removed from the second transfer jig 66, thus obtaining desired ceramic electronic components 1.

Here, as a method of arranging the electronic component bodies 10 in step S4, the following process may also be performed. That is, first, in step S4, the electronic component bodies 10 are not arranged on the second transfer jig 66, and the electronic component bodies 10 are arranged on a third transfer jig (not shown) by suction. Then, the third transfer jig is inverted in a state in which the electronic component bodies 10 are arranged on the third transfer jig, and the electronic component bodies 10 are transferred to the second transfer jig 66 and are arranged therein.

In addition, a picking and placing mechanism using a suction nozzle (for example, a mounting type using a mounter) may be used instead of the second transfer jig 66.

Next, with respect to the ceramic electronic component 1 obtained by the above-described method, an evaluation test about a relationship with a vibration sound (acoustic noise) of the mounting substrate was performed.

First, as a non-limiting example, the electronic component body 10 as a stacked ceramic capacitor having dimensions of a length of 2.0 (±0.15) mm, a width of 1.25 (±0.15) mm, a height of 1.25 (±0.15) mm (in each case, ±0.15 represents a manufacturing tolerance), and a capacity of 10 μF was prepared according to the above-described method of manufacturing the ceramic electronic component. Then, the plated film 56 on the peripheral surface 46 of the mounting portion 50 and the extension portions 52 of the pair of metal terminals 12A and 13A was removed, and then the pair of metal terminals 12A and 13A in which the plating-removal portion 58 was formed were mounted on the electronic component body 10, thus preparing the ceramic electronic component 1. In this example, the pair of metal terminals 12 and 13, which were obtained by the following method, were also prepared. In the method, a portion of the peripheral surface 46 of the mounting portion 50 and the extension portions 52 of the pair of metal terminals 12A and 13A, in which the plated film 56 was not formed, were covered with a resist, the plated film 56 was formed on the pair of metal terminals 12 and 13, and the resist was removed.

As Example 1, a ceramic electronic component 1 in which the direction of the inner electrodes 32a and 32b when mounting the ceramic electronic component 1 on the mounting substrate was set to be perpendicular to a mounting surface was prepared, and as Example 2, a ceramic electronic component 1 in which the direction of the inner electrodes 32a and 32b when mounting the ceramic electronic component 1 on the mounting substrate was set to be parallel (horizontal) with the mounting surface was prepared.

In addition, as the bonding member that was used to mount the pair of metal terminals 12A and 13A on the electronic component body 10, Sn—Sb solder containing about 10% of Sb was preferably used, for example. The amount of gap of the electronic component body 10 was set to about 0.5 mm, for example.

In addition, with regard to Comparative Example 1, a simple body in which the direction of the inner electrodes when being mounted on the mounting substrate was set to be perpendicular to the mounting surface was prepared as a simple body of the electronic component body 10 on which the pair of metal terminals 12A and 13A were not mounted. In addition, with regard to Comparative Example 2, a simple body in which the direction of the inner electrodes when being mounted on the mounting substrate was set to be parallel (horizontal) with the mounting surface was prepared as a simple body of the electronic component body 10 on which the pair of metal terminals 12A and 13A were not mounted. In addition, with regard to Comparative Example 3, a simple body in which the direction of the inner electrodes when being mounted on the mounting substrate was set to be perpendicular to the mounting surface was prepared as a simple body of the electronic component body 10 in which the plating-removal portion 58 was not formed in the pair of metal terminals 12A and 13A (that is, U-shaped metal terminals). In addition, with regard to Comparative Example 4, a simple body in which the direction of the inner electrodes when being mounted on the mounting substrate was set to be parallel (horizontal) with the mounting surface was prepared as a simple body in which the plating-removal portion 58 was not formed in the pair of metal terminals 12A and 13A. The other conditions were set to be same as the examples.

In addition, in each of Example 1, Example 2, and Comparative Examples 1 to 4, five samples were prepared.

Figure 25:
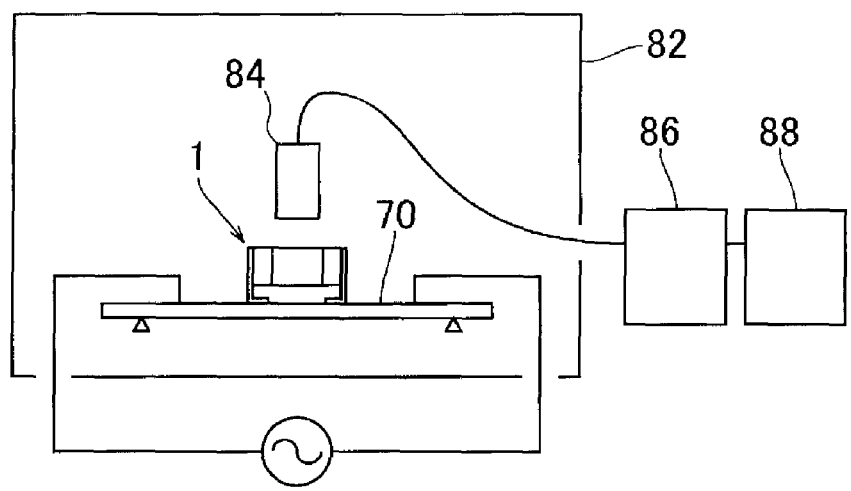
FIG. 25 is a view illustrating an example of a device that measures vibration sound of a mounting substrate on which the ceramic electronic component is mounted.
Figure 26:
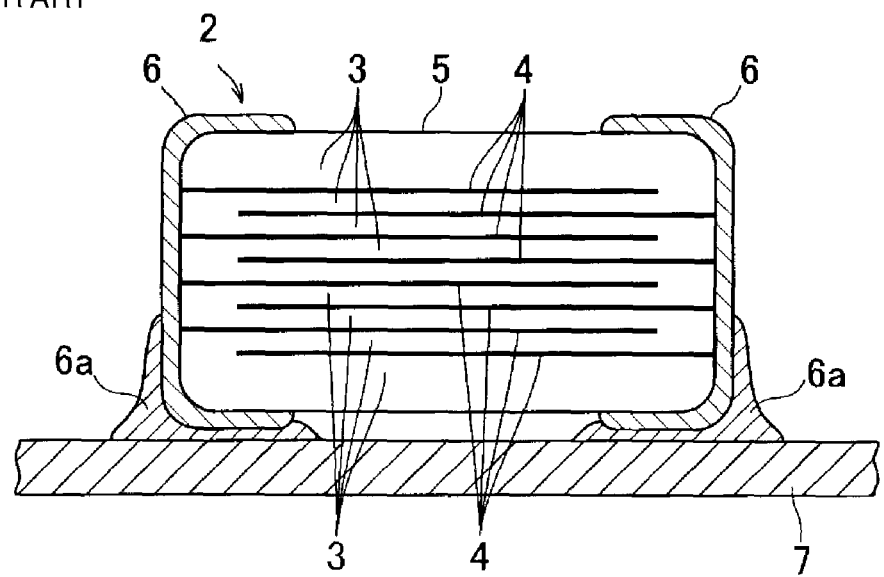
FIG. 26 is a view illustrating a state in which a stacked ceramic capacitor in the related art is mounted on the mounting substrate.
Figure 27:
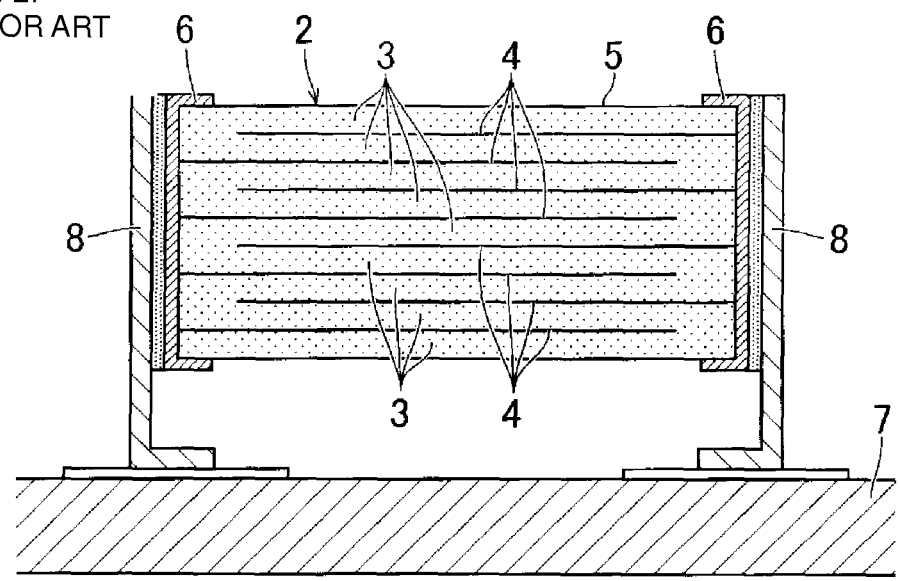
FIG. 27 is an external perspective view illustrating a ceramic electronic component including the stacked ceramic capacitor which is suggested to solve a problem related to the stacked ceramic capacitor illustrated in FIG. 26.
Figure 28:
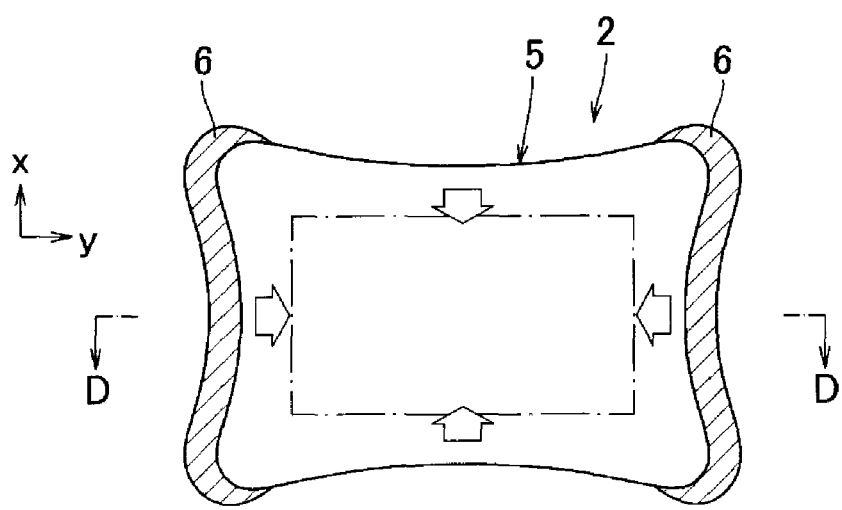
FIG. 28 is a top view schematically illustrating the stacked ceramic capacitor illustrated in FIG. 27.
Figure 29:
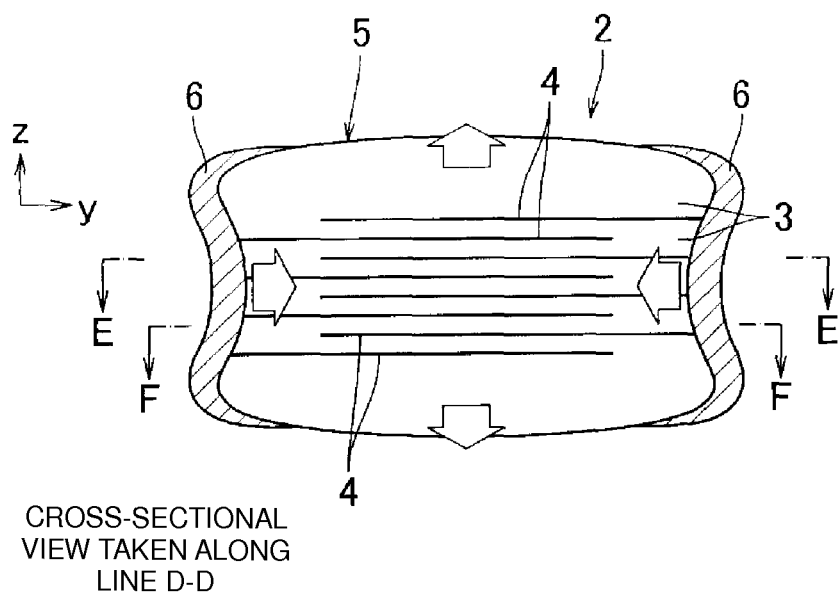
FIG. 29 is a cross-sectional view in a cross-section taken along line D-D in FIG. 28.
Figure 30:
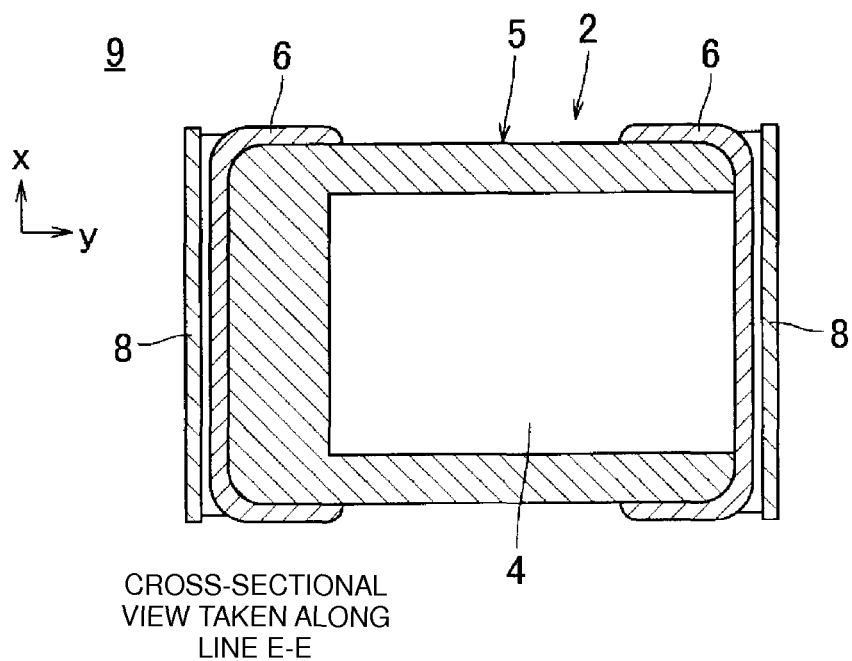
FIG. 30 is a cross-sectional view in a cross-section taken along line E-E in FIG. 29.
Figure 31:
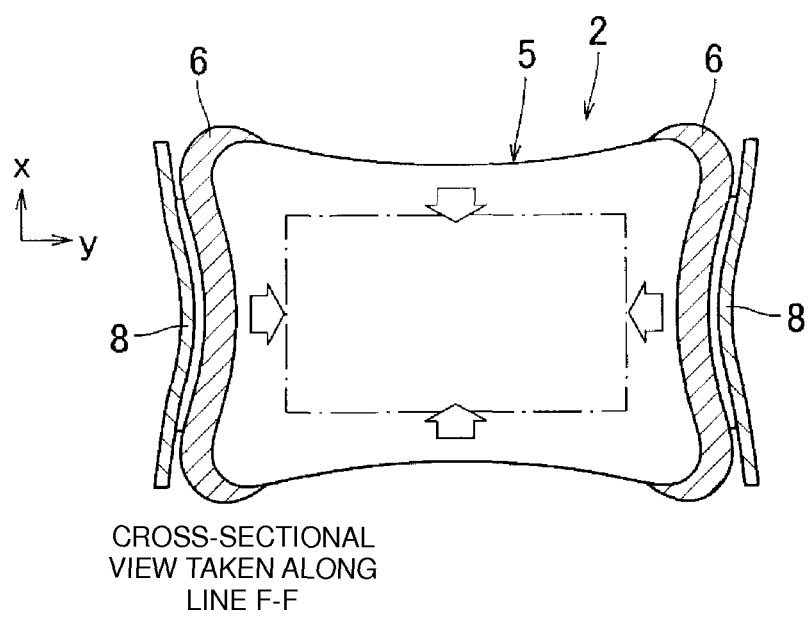
FIG. 31 is a cross-sectional view in a cross-section taken along line F-F in FIG. 29.

FIG. 25 is a view illustrating an example of a device that measures vibration sound of the mounting substrate on which the ceramic electronic component is mounted.

The ceramic electronic component 1 was mounted on a glass epoxy mounting substrate 70 having a thickness of 1.6 mm using a predetermined amount of mounting solder, and a vibration sound (acoustic noise) of the mounting substrate 70 was measured by an acoustic noise measuring device 80 illustrated in FIG. 25.

The mounting substrate 70 on which the ceramic electronic component 1 was mounted was placed in an anechoic box 82, and an AC voltage in which a frequency was 3 kHz and a voltage was 1 Vpp was applied to the ceramic electronic component 1. In addition, a vibration sound (acoustic noise) generated at that time was collected using a sound collection microphone 84, and a sound pressure level of the sound collected by a sound-level meter 86 and an FFT analyzer 88 (CF-5220, manufactured by Ono Sokki Co., Ltd) was measured. In addition, the sound collection microphone 84 was provided to be spaced away from the mounting substrate 70 by about 3 mm, for example.

With respect to measurement results, values obtained by averaging five pieces of data of the respective samples of Example 1, Example 2, and Comparative Examples 1 to 4 are shown in the following table.

|  | Sound pressure level (dB) |
| --- | --- |
| Example 1 | 26.85 |
| Example 2 | 24.37 |
| Comparative Example 1 | 49.42 |
| Comparative Example 2 | 39.31 |
| Comparative Example | 35.20 |
| Comparative Example 4 | 33.15 |

From the results, the sound pressure level of Comparative Example 1 was 49.42 dB, the sound pressure level of Comparative Example 2 was 39.61 dB, the sound pressure level of Comparative Example 3 was 35.20 dB, and the sound pressure level of Comparative Example 4 was 33.15 dB. In contrast, the sound pressure levels of the ceramic electronic component 1 according to Example 1 and Example 2 decreased to 26.85 dB and 24.37 dB, respectively. Accordingly, the space of the gap portion could be sufficiently secured, and thus transmission of vibration to the mounting substrate was significantly reduced. As a result, it was confirmed that the effect of significantly reducing or preventing acoustic noise of the ceramic electronic component is stably exhibited. This effect was considered to be because in the ceramic electronic component 1 according to Example 1 and Example 2, the plating-removal portion 58 from which the plated film 56 was removed was formed in the peripheral surface 46 of the mounting portion 50 and the extension portions 52 of the pair of metal terminals 12A and 13A, and the surface of the terminal body 54 was exposed, and thus wetting of the mounting solder to the pair of metal terminals 12A and 13A was suppressed when mounting the ceramic electronic component 1 on the mounting substrate 70 with the mounting solder. According to this effect, wetting of the mounting solder between the electronic component body 10 and the pair of metal terminals 12A and 13A (the gap portion) is significantly reduced or prevented, and thus the mounting solder is prevented from being filled in the gap portion.

In addition, in the ceramic electronic component 1 according to the above-described preferred embodiment, the plating-removal portion of the pair of metal terminals was provided in the peripheral surface of the extension portions and the mounting portion of the pair of metal terminals. However, there is no limitation thereto, and the plating-removal portion from which the plated film is removed may be provided only in the peripheral surface of the mounting portion of the pair of metal terminals. In addition, the plating-removal portion from which the plated film is removed may be provided in the peripheral surface of the terminal bonding portion of the pair of metal terminals. That is, the plating-removal portion may be provided in the entire peripheral surface of the pair of metal terminals.

In addition, the present invention is not limited to the above-described preferred embodiment, and various modifications may be made in a range of the gist of the present invention. In addition, the thickness of the ceramic layers of the stacked ceramic capacitor, the number of layers, the area and external dimensions of counter electrodes are not limited to the above-described preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component, comprising:
   an electronic component body including a ceramic element assembly that includes two opposite main surfaces, two opposite end surfaces, and two opposite side surfaces, and outer electrodes, each being configured to cover each of the end surfaces and a portion of the side surfaces of the ceramic element assembly; and
   metal terminals, each being connected to each of the outer electrodes at positions on both of the side surfaces of the ceramic element assembly; wherein
   each of the metal terminals includes:
      a terminal body;
      a plated film that is located on a surface of the terminal body;
      terminal bonding portions that are connected to the outer electrode at positions on the side surfaces of the ceramic element assembly;
      a mounting portion which is connected to an electrode of a mounting substrate on which the ceramic electronic component is mounted, and which faces a lower surface of the ceramic element assembly; and
      extension portions, each being provided between each of the terminal bonding portions and the mounting portion to provide a gap between a surface of the ceramic element assembly which faces the mounting substrate and the mounting portion;
   the surface of the terminal body is exposed at a peripheral surface of the mounting portion;
   each of the metal terminals has a U-shaped or substantially U-shaped cross-section;
   the terminal bonding portions contact only the side surfaces of the ceramic element assembly; and
   the terminal bonding portions do not contact the end surfaces or the main surfaces of the ceramic element assembly.

2. The ceramic electronic component according to claim 1, wherein the surface of the terminal body is exposed at a peripheral surface of the extension portion.

3. The ceramic electronic component according to claim 1, wherein the surface of the terminal body is exposed at a peripheral surface of the terminal bonding portion.

4. The ceramic electronic component according to claim 1, wherein the terminal bonding portion, the mounting portion, and the extension portion integral with each other so as to define a single unitary member.

5. The ceramic electronic component according to claim 1, wherein each of the terminal bonding portions of the metal terminals is rectangular or substantially rectangular plate shaped and has a same size or approximately a same size as a width of one of the outer electrodes.

6. The ceramic electronic component according to claim 1, wherein the mounting portion of each of the pair of metal terminals is bent toward the electronic component body and is parallel or substantially parallel with one of the main surfaces.

7. The ceramic electronic component according to claim 1, wherein each of the extension portions of the metal terminals has a rectangular or a substantially rectangular plate shape, extends from the terminal bonding portions in a height direction perpendicular to the main surfaces, and is located in a same plane as one of the terminal bonding portions.

8. The ceramic electronic component according to claim 1, wherein each of the terminal bodies is made of at least one of Ni, Fe, Cu, Ag, Cr, and an alloy containing one or more of Ni, Fe, Cu, Ag, Cr.

9. The ceramic electronic component according to claim 1, wherein each of the terminal bodies includes a metal of a base material made of one of an Fe-42Ni alloy and an Fe-18Cr alloy.

10. The ceramic electronic component according to claim 1, wherein the plated film includes a lower-layer plated film and an upper-layer plated film.

11. The ceramic electronic component according to claim 1, further comprising a plating-removal portion from which the plated film is removed provided at least at the peripheral surface of the mounting portion.

12. The ceramic electronic component according to claim 11, wherein the plating-removal portion is located on a peripheral surface of the extension portions of the metal terminals.

13. The ceramic electronic component according to claim 1, wherein a base material of the metal terminal is exposed at the peripheral surface of the mounting portion.

14. The ceramic electronic component according to claim 1, wherein the plated film is not located on a peripheral surface of the mounting portion and is not located on a peripheral portion of the extension portion.

15. The ceramic electronic component according to claim 1, wherein protrusions having a convex shape extending in a direction of one of the main surfaces are provided on the terminal bonding portions.

16. The ceramic electronic component according to claim 1, wherein curved portions, which are curved toward a direction extending away from the side surfaces, are provided in the extension portions.

17. The ceramic electronic component according to claim 1, wherein the extension portions include notches.

18. The ceramic electronic component according to claim 1, wherein notches are provided in front ends of the terminal bonding portions.

19. The ceramic electronic component according to claim 1, wherein a width of the extension portions and the mounting portion in a longitudinal direction connecting the end surfaces of the ceramic element assembly is shorter than a width of the terminal bonding portion in the longitudinal direction.

* * * * *